United States Patent
Patterson et al.

(10) Patent No.: US 6,913,404 B2
(45) Date of Patent: Jul. 5, 2005

(54) FILM PROCESSING SOLUTION CARTRIDGE AND METHOD FOR DEVELOPING AND DIGITIZING FILM

(75) Inventors: Richard A. Patterson, Georgetown, TX (US); Joseph B. Gault, Austin, TX (US); John J. Straigis, Stanford, CA (US); William D. Mapel, Liberty Hill, TX (US); Michael R. Thering, Austin, TX (US); G. Gregory Mooty, Austin, TX (US); Patrick W. Lea, Austin, TX (US); Kosta S. Selinidis, Austin, TX (US); Steven K. Brown, Austin, TX (US); Homero Saldana, Austin, TX (US); Eric C. Segerstrom, Austin, TX (US); Stacy S. Cook, Austin, TX (US); Leland A. Lester, Austin, TX (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 10/378,062

(22) Filed: Mar. 3, 2003

(65) Prior Publication Data

US 2004/0076425 A1 Apr. 22, 2004

Related U.S. Application Data

(63) Continuation of application No. 09/778,022, filed on Feb. 5, 2001, now Pat. No. 6,599,036.
(60) Provisional application No. 60/180,032, filed on Feb. 3, 2000, and provisional application No. 60/180,478, filed on Feb. 3, 2000.

(51) Int. Cl.[7] .............................. G03D 3/02; G03D 5/00
(52) U.S. Cl. ........................ 396/604; 396/626; 396/627; 396/636; 355/27
(58) Field of Search ................................. 396/604, 626, 396/627, 636, 641; 355/27–29; 430/30

(56) References Cited

U.S. PATENT DOCUMENTS

| 2,404,138 A | 7/1946 | Mayer .......................... 95/94 |
| 3,520,689 A | 7/1970 | Nagae et al. .................. 96/55 |
| 3,520,690 A | 7/1970 | Nagae et al. .................. 96/55 |

(Continued)

FOREIGN PATENT DOCUMENTS

| EP | 0 261 782 A2 | 8/1987 | ............ H04N/1/46 |
| EP | 0 422 220 A1 | 3/1989 | ............ A61B/6/03 |
| EP | 0 482 790 B1 | 9/1991 | ............ H04N/1/40 |

(Continued)

OTHER PUBLICATIONS

Method of Supplying Processing Liquid to a Photographic Processing Machine and Removing Waste Liquid Therefrom by Verlinden et al. Research Disclosure, Apr. 1998, pp 425–428.*

"Adaptive Fourier Threshold Filtering: A Method to Reduce Noise and Incoherent Artifacts in High Resolution Cardiac Images", Doyle, M., et al., 8306 Magnetic Resonance in Medicine 31, No. 5, Baltimore, MD, May, pp. 546–550, 1994.

(Continued)

Primary Examiner—D. Rutledge
(74) Attorney, Agent, or Firm—Simon, Galasso and Frantz; David A. Novais

(57) ABSTRACT

A digital film processing system and film processing solution cartridge are disclosed. The cartridge comprises a housing and a chamber for storing a film processing fluid. The processing solution may be contained within a flexible bladder within the chamber. The cartridge may also include an integral applicator for coating the processing solution onto undeveloped film. The cartridge is generally removeably attached to the film processing system, but may also be refillable.

34 Claims, 9 Drawing Sheets

U.S. PATENT DOCUMENTS

| | | | |
|---|---|---|---|
| 3,587,435 A | 6/1971 | Chioffe | 95/89 |
| 3,615,479 A | 10/1971 | Kohler et al. | 96/48 |
| 3,615,498 A | 10/1971 | Aral | 96/55 |
| 3,617,282 A | 11/1971 | Bard | 96/59 |
| 3,680,462 A * | 8/1972 | Cronig | 396/604 |
| 3,747,120 A | 7/1973 | Stemme | 346/75 |
| 3,833,161 A | 9/1974 | Krumbein | 226/92 |
| 3,903,541 A | 9/1975 | Von Meister et al. | 354/317 |
| 3,946,398 A | 3/1976 | Kyser et al. | 346/1 |
| 3,959,048 A | 5/1976 | Stanfield et al. | 156/94 |
| 4,026,756 A | 5/1977 | Stanfield et al. | 156/554 |
| 4,081,577 A | 3/1978 | Horner | 427/424 |
| 4,142,107 A | 2/1979 | Hatzakis et al. | 250/571 |
| 4,215,927 A | 8/1980 | Grant et al. | 354/317 |
| 4,249,985 A | 2/1981 | Stanfield | 156/554 |
| 4,265,545 A | 5/1981 | Slaker | 356/431 |
| 4,301,469 A | 11/1981 | Modeen et al. | 358/75 |
| 4,490,729 A | 12/1984 | Clark et al. | 346/75 |
| 4,501,480 A | 2/1985 | Matsui et al. | 354/298 |
| 4,533,275 A * | 8/1985 | Foggini | 403/165 |
| 4,564,280 A | 1/1986 | Fukuda | 354/317 |
| 4,594,598 A | 6/1986 | Iwagami | 346/140 |
| 4,621,037 A | 11/1986 | Kanda et al. | 430/30 |
| 4,623,236 A | 11/1986 | Stella | 354/318 |
| 4,633,300 A | 12/1986 | Sakai | 358/41 |
| 4,636,808 A | 1/1987 | Herron | 346/75 |
| 4,666,307 A | 5/1987 | Matsumoto et al. | 356/404 |
| 4,670,779 A | 6/1987 | Nagano | 358/75 |
| 4,736,221 A | 4/1988 | Shidara | 354/317 |
| 4,741,621 A | 5/1988 | Taft et al. | 356/376 |
| 4,745,040 A | 5/1988 | Levine | 430/21 |
| 4,755,844 A | 7/1988 | Tsuchiya et al. | 354/317 |
| 4,777,102 A | 10/1988 | Levine | 430/21 |
| 4,796,061 A | 1/1989 | Ikeda et al. | 355/73 |
| 4,814,630 A | 3/1989 | Lim | 250/578 |
| 4,821,114 A | 4/1989 | Gebhardt | 358/75 |
| 4,845,551 A | 7/1989 | Matsumoto | 358/80 |
| 4,851,311 A | 7/1989 | Millis et al. | 430/30 |
| 4,857,430 A | 8/1989 | Millis et al. | 430/30 |
| 4,875,067 A | 10/1989 | Kanzaki et al. | 354/325 |
| 4,969,045 A | 11/1990 | Haruki et al. | 358/228 |
| 4,994,918 A | 2/1991 | Lingemann | 358/214 |
| 5,027,146 A | 6/1991 | Manico et al. | 354/299 |
| 5,034,767 A | 7/1991 | Netz et al. | 354/317 |
| 5,101,286 A | 3/1992 | Patton | 358/487 |
| 5,124,216 A | 6/1992 | Giapis et al. | 430/30 |
| 5,155,596 A | 10/1992 | Kurtz et al. | 358/214 |
| 5,196,285 A | 3/1993 | Thomson | 430/30 |
| 5,200,817 A | 4/1993 | Birnbaum | 358/80 |
| 5,212,512 A | 5/1993 | Shiota | 354/319 |
| 5,231,439 A | 7/1993 | Takahashi et al. | 354/313 |
| 5,235,352 A | 8/1993 | Pies et al. | 346/140 |
| 5,255,408 A | 10/1993 | Blackman | 15/308 |
| 5,266,805 A | 11/1993 | Edgar | 250/330 |
| 5,267,030 A | 11/1993 | Giorgianni et al. | 358/527 |
| 5,292,605 A | 3/1994 | Thomson | 430/30 |
| 5,296,923 A | 3/1994 | Hung | 358/527 |
| 5,334,247 A | 8/1994 | Columbus et al. | 118/411 |
| 5,350,651 A | 9/1994 | Evans et al. | 430/21 |
| 5,350,664 A | 9/1994 | Simons | 430/362 |
| 5,357,307 A | 10/1994 | Glanville et al. | 354/324 |
| 5,360,701 A | 11/1994 | Elton et al. | 430/501 |
| 5,371,542 A | 12/1994 | Pauli et al. | 348/262 |
| 5,391,443 A | 2/1995 | Simons et al. | 430/21 |
| 5,414,779 A | 5/1995 | Mitch | 382/199 |
| 5,416,550 A | 5/1995 | Skye et al. | 354/298 |
| 5,418,119 A | 5/1995 | Simons | 430/507 |
| 5,418,597 A | 5/1995 | Lahcanski et al. | 355/76 |
| 5,432,579 A | 7/1995 | Tokuda | 354/293 |
| 5,436,738 A | 7/1995 | Manico | 358/503 |
| 5,440,365 A | 8/1995 | Gates et al. | 354/298 |
| 5,447,811 A | 9/1995 | Buhr et al. | 430/20 |
| 5,448,380 A | 9/1995 | Park | 358/520 |
| 5,452,018 A | 9/1995 | Capitant et al. | 348/651 |
| 5,465,155 A | 11/1995 | Edgar | 358/500 |
| 5,477,345 A | 12/1995 | Tse | 358/500 |
| 5,488,447 A * | 1/1996 | Patton et al. | 396/578 |
| 5,496,669 A | 3/1996 | Pforr et al. | 430/22 |
| 5,516,608 A | 5/1996 | Hobbs et al. | 430/30 |
| 5,519,510 A | 5/1996 | Edgar | 358/471 |
| 5,546,477 A | 8/1996 | Knowles et al. | 382/242 |
| 5,550,566 A | 8/1996 | Hodgson et al. | 345/202 |
| 5,552,904 A | 9/1996 | Ryoo et al. | 358/518 |
| 5,563,717 A | 10/1996 | Koeng et al. | 358/406 |
| 5,568,220 A * | 10/1996 | Joos et al. | 396/626 |
| 5,568,270 A | 10/1996 | Endo | 358/298 |
| 5,576,836 A | 11/1996 | Sano et al. | 358/302 |
| 5,581,376 A | 12/1996 | Harrington | 358/518 |
| 5,587,752 A | 12/1996 | Petruchik | 396/315 |
| 5,596,415 A | 1/1997 | Cosgrove et al. | 358/296 |
| 5,627,016 A | 5/1997 | Manico | 430/434 |
| 5,649,260 A | 7/1997 | Wheeler et al. | 396/569 |
| 5,664,253 A | 9/1997 | Mevers | 396/603 |
| 5,664,255 A | 9/1997 | Wen | 396/627 |
| 5,667,944 A | 9/1997 | Reem et al. | 430/359 |
| 5,678,116 A | 10/1997 | Sugimoto et al. | 396/611 |
| 5,691,118 A | 11/1997 | Haye | 430/357 |
| 5,694,635 A * | 12/1997 | Earle et al. | 396/578 |
| 5,695,914 A | 12/1997 | Simon et al. | 430/379 |
| 5,698,382 A | 12/1997 | Nakahanada et al. | 430/418 |
| 5,726,773 A | 3/1998 | Mehlo et al. | 358/474 |
| 5,739,897 A | 4/1998 | Frick et al. | 355/40 |
| 5,771,107 A | 6/1998 | Fujimoto et al. | 358/464 |
| 5,790,277 A | 8/1998 | Edgar | 358/487 |
| 5,835,795 A | 11/1998 | Craig et al. | 396/6 |
| 5,835,811 A | 11/1998 | Tsumura | 396/598 |
| 5,870,172 A | 2/1999 | Blume | 355/27 |
| 5,880,819 A | 3/1999 | Tanaka et al. | 355/75 |
| 5,892,595 A | 4/1999 | Yamakawa et al. | 358/530 |
| 5,930,388 A | 7/1999 | Murakami et al. | 382/167 |
| 5,959,720 A | 9/1999 | Kwon et al. | 355/38 |
| 5,963,662 A | 10/1999 | Vachtsevanos et al. | 382/150 |
| 5,966,465 A | 10/1999 | Keith et al. | 382/232 |
| 5,979,011 A | 11/1999 | Miyawaki et al. | 15/308 |
| 5,982,936 A | 11/1999 | Tucker et al. | 382/233 |
| 5,982,937 A | 11/1999 | Accad | 382/239 |
| 5,982,941 A | 11/1999 | Loveridge et al. | 382/260 |
| 5,982,951 A | 11/1999 | Katayama et al. | 382/284 |
| 5,988,896 A | 11/1999 | Edgar | 396/604 |
| 5,991,444 A | 11/1999 | Burt et al. | 382/232 |
| 5,998,109 A | 12/1999 | Hirabayashi | 430/434 |
| 6,000,284 A | 12/1999 | Shin et al. | 73/150 |
| 6,005,987 A | 12/1999 | Nakamura et al. | 382/294 |
| 6,065,824 A | 5/2000 | Bullock et al. | 347/19 |
| 6,069,714 A | 5/2000 | Edgar | 358/487 |
| 6,088,084 A | 7/2000 | Nishio | 355/75 |
| 6,089,687 A | 7/2000 | Helterline | 347/7 |
| 6,101,273 A | 8/2000 | Matama | 382/169 |
| 6,102,508 A | 8/2000 | Cowger | 347/7 |
| 6,137,965 A | 10/2000 | Burgeios et al. | 396/626 |
| 6,200,738 B1 | 3/2001 | Takano et al. | 430/362 |

FOREIGN PATENT DOCUMENTS

| | | | | |
|---|---|---|---|---|
| EP | 0 525 886 A3 | 7/1992 | | G03D/5/00 |
| EP | 0 580 293 A1 | 6/1993 | | H04N/1/04 |
| EP | 0 580 293 A1 | 1/1994 | | H04N/1/04 |
| EP | 0 601 364 A1 | 6/1994 | | H04N/1/387 |
| EP | 0 669 753 A2 | 2/1995 | | H04N/1/407 |
| EP | 0 794 454 A2 | 2/1997 | | G03B/27/73 |
| EP | 0 768 571 A2 | 4/1997 | | G03D/13/00 |
| EP | 0 806 861 A1 | 11/1997 | | H04N/1/00 |

| | | | | |
|---|---|---|---|---|
| EP | 0 878 777 A2 | 11/1998 | ............. | G06T/5/40 |
| EP | 0 930 498 A2 | 12/1998 | .......... | G01N/21/88 |
| WO | WO 90/01240 | 2/1990 | ............. | H04N/1/40 |
| WO | WO 91/09493 | 6/1991 | .......... | H04N/5/217 |
| WO | WO 97/25652 | 7/1997 | ............. | G03D/5/00 |
| WO | WO 98/19216 | 5/1998 | ............. | G03C/5/29 |
| WO | WO 98/25399 | 6/1998 | ............. | H04N/1/38 |
| WO | WO 98/31142 | 7/1998 | .......... | H04N/5/253 |
| WO | WO 98/34157 | 8/1998 | | |
| WO | WO 98/34397 | 8/1998 | | |
| WO | WO 99/43148 | 8/1999 | ............. | H04N/1/00 |
| WO | WO 99/43149 | 8/1999 | | |
| WO | WO 01/01197 | 1/2001 | ............. | G03D/5/00 |
| WO | WO 01/13174 A1 | 2/2001 | ............. | G03D/5/06 |
| WO | WO 01/45042 A1 | 6/2001 | ............. | G06T/5/00 |
| WO | WO 01/50192 A1 | 7/2001 | ........... | G03C/7/407 |
| WO | WO 01/50193 A1 | 7/2001 | ........... | G03C/7/407 |
| WO | WO 01/50194 A1 | 7/2001 | ............. | G03C/7/407 |
| WO | WO 01/50197 A1 | 7/2001 | ............. | G03C/7/42 |
| WO | WO 01/52556 A2 | 7/2001 | ............. | H04N/9/11 |

OTHER PUBLICATIONS

"Anisotropic Spectral Magnitude Estimation Filters for Noise Reduction and Image Enhancement", Aich, T., et al., Philips GmbH Research Laboratories, IEEE, pp. 335–338, 1996.

"Adaptive–neighborhood filtering of images corrupted by signal–dependent noise", Rangayyan, R., et al., Applied Optics, vol. 37, No. 20, pp. 4477–4487, Jul. 10, 1998.

"Grayscale Characteristics", The Nature of Color Images, Photographic Negatives, pp. 163–168.

"Parallel Production of Oligonucleotide Arrays Using Membranes and Reagent Jet Printing",Stimpson, D., et al., Research Reports, BioTechniques, vol. 25, No. 5, pp. 886–890, 1998.

"Low–Cost Display Assembly and Interconnect Using Ink–Jet Printing Technology", Hayes, D. et al., Display Works '99, MicroFab Technologies, Inc., pp. 1–4, 1999.

"Ink–Jet Based Fluid Microdispensing in Biochemical Applications", Wallace, D., MicroFab Technologies, Inc., Laboratory Automation News, vol. 1, No. 5, pp. 6–9, Nov., 1996.

"Photorealistic Ink–Jet Printing Through Dynamic Spot Size Control", Wallace. D., Journal of Imaging Science and Technology, vol. 40, No. 5, pp. 390–395, Sept./Oct. 1996.

"MicroJet Printing of Solder and Polymers for Multi–Chip Modules and Chip–Scale Package", Hayes, D., et al., Micro-Fab Technologies, Inc.

"A Method of Characteristics Model of a Drop–on–Demand Ink–Jet Device Using an Integral Method Drop Formation Model", Wallce, D., MicroFab Technologies, Inc., The American Society of Mechanical Engineers, Winter Annual Meeting, pp. 1–9, Dec. 10–15, 1989.

"Digital Imaging Equipment White Papers", Putting Damaged Film on ICE, www.nikousa.com/reference/whitepapers/imaging, Nikon Corporation, Nov. 28, 2000.

* cited by examiner

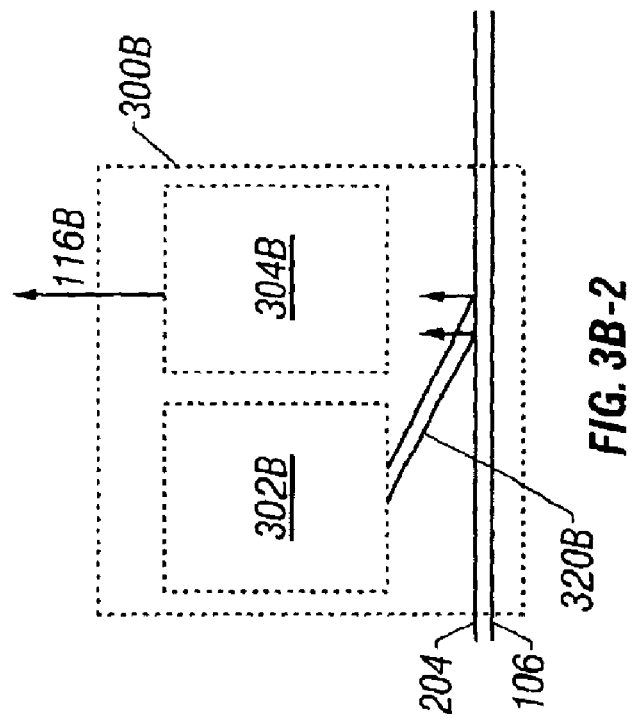
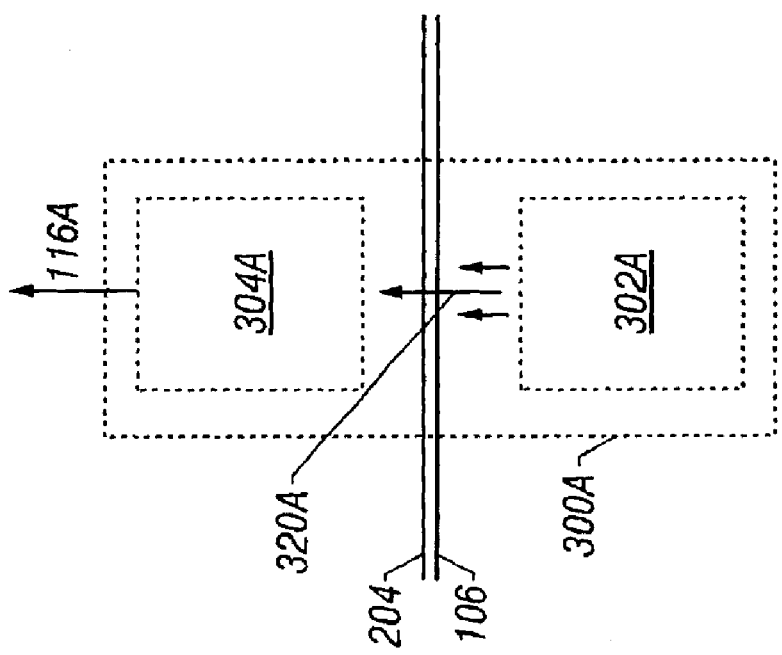

FILM PROCESSING SOLUTION CARTRIDGE AND METHOD FOR DEVELOPING AND DIGITIZING FILM

CROSS REFERENCE TO RELATED APPLICATIONS

This application claims the benefit under 35 U.S.C. § 119(e) of U.S. Provisional Application Ser. No. 60/180,032, entitled "*System, Method, And Apparatus For Dispensing Fluid Coatings*", which was filed on Feb. 3, 2000. This application is related to U.S. Provisional Application Ser. No. 60/180,478, entitled "*Method And System for Digital Film Processing*" which was filed on Feb. 3, 2000.

This application is a Continuation of U.S. Patent application Ser. No. 09/778,022, now U.S. Pat. No. 6,599,036, entitled "Film Processing Solution Cartridge And Method For Developing And Digitizing Film, the subject matter of which is herein incorporated by reference.

FIELD OF THE INVENTION

The present invention relates generally to film developing systems, and more particularly to a film processing solution cartridge and method for developing and digitizing film.

BACKGROUND OF THE INVENTION

Images are used to communicate information and ideas. Images, including print pictures, film negatives, documents and the like, are often digitized to produce a digital image that can then be instantly communicated, viewed, enhanced, modified, printed or stored. The flexibility of digital images, as well as the ability to instantly communicate digital images, has led to a rising demand for improved systems and methods for film processing and the digitization of film based images into digital images. Film based images are traditionally digitized by electronically scanning a film negative or film positive that has been conventionally developed using a wet chemical developing process.

In a traditional wet chemical developing process, the film is immersed and agitated in a series of tanks containing different processing solutions. The temperature and concentration level of the particular processing solution is strictly controlled to ensure uniformity of the development process. The film is immersed in each tank for a specific period of time depending upon the particular type of film. In particular, the development process is generally modified for film having different speeds and different manufactures.

The first tank typically contains a developing solution. The developing solution chemically reacts with the exposed silver halide to produce elemental metallic silver grains in each emulsion layer of the film. The metallic silver grains form a silver image within each emulsion layer of the film. The by-product of the chemical reaction combines with a dye coupler in each emulsion layer to create a dye cloud. The color of the dye cloud is complementary to the band of light the emulsion layer has been sensitized to. For example, the red sensitized layer typically produces a cyan dye image, the green sensitized layer a magenta dye image, and the blue sensitized layer a yellow dye image. The density of the silver image and the corresponding dye image in each emulsion layer are directly proportional to the intensity of light the film was exposed to. The developing process is generally stopped by removing the film from the developer tank and rinsing or immersing the film in water or an acidic solution.

Conventional wet chemical developing processes then removes both the silver image and the undeveloped silver halide grains from the film to produce a film negative having only a dye image within the film negative. To remove the silver image and undeveloped silver halide, the developed film is immersed and agitated in a tank of bleaching solution. The bleaching solution chemically oxidizes the metallic silver grains forming the silver image and converts the metallic silver grains into a silver halide compound. The bleached film is then immersed and agitated in a tank of fixer solution. The fixer solution removes the silver halide from the film by dissolving the silver halide crystals. The film is then washed, stabilized and dried to produce a conventional film negative.

If a digital image is required, the conventionally produced film negative is digitized using a conventional electronic scanner. Conventional electronic film scanners generally operate by directing white light through the film negative. The light interacts with the dye image and the intensity of light transmitted through the film is recorded by a sensor that produces individual red, green and blue color data. The sensor color data is used to produce the digital image.

The various processing solutions are expensive and become contaminated during the development process. These contaminated solutions form environmentally hazardous materials and various governmental regulations govern the disposal of the contaminated solutions. In addition, criminal penalties may attach to the improper disposal of the contaminated solutions. As a result, the costs associated with developing film continue to increase.

A relatively new process under development is digital film processing (DFP). DFP systems scan the film during the development process. DFP systems apply a thin coat of one or more film processing solutions to the film and then scan the film through the coating. Neither the processing solutions nor the silver compounds within the film are washed from the film. DFP systems may comprise a number of different configurations depending upon the method of film processing and the method of scanning the film. For example, in some embodiments, the metallic silver grains and silver halide are not modified and the film is scanned with visible light.

SUMMARY OF THE INVENTION

One implementation of the invention is a film processing solution cartridge. One embodiment of the film processing solution cartridge comprises a housing, a chamber disposed within the housing, and a film processing solution disposed within the chamber. The housing is replaceably attached to a film processing system. In a particular embodiment, a bladder containing the film processing solution is disposed within the chamber. In another embodiment, the film processing solution cartridge includes a fluid communication system. In a particular embodiment, the fluid communication system forms a portion of a peristaltic pump. In yet another embodiment, the film processing solution cartridge includes an integral applicator.

Another implementation of the invention is a digital film processing system. One embodiment of the digital film processing system comprises an applicator station having a processing solution cartridge, a scanning system, and a data processing system. The applicator station operates to coat a processing solution onto a film. The scanning system operates to scan the coated film and produce sensor data that is communicated to the data processing system. The data processing system processes the sensor data to produce a digital image. The digital film processing system may also include a printer, access to a communication network such as the Internet, or a memory storage device.

An advantage of at least one embodiment of the invention is that by dispensing the processing solution from replaceable or refillable cartridges, equipment down-time may be reduced. Another advantage of at least one embodiment of the invention is that a processing solution cartridge may be conveniently and quickly replaced when necessary.

BRIEF DESCRIPTION OF THE DRAWINGS

For a more complete understanding of the invention and the advantages thereof, reference, is now made to the following description taken in conjunction with the accompanying drawings, wherein like reference numerals represent like parts, in which:

FIGS. 2C-1 through 2C-4 are block diagrams illustrating various embodiments of a processing station shown in FIG. 2A;

FIGS. 3B-1 through 3B-4 are block diagrams illustrating various embodiments of a scanning station shown in FIG. 3A.

DETAILED DESCRIPTION OF THE INVENTION

In the following detailed description of the preferred embodiments, reference is made to the accompanying drawings which form a part hereof, and in which is shown by way of illustration specific preferred embodiments in which the invention may be practiced. These embodiments are described in sufficient detail to enable those skilled in the art to practice the invention, and it is to be understood that other embodiments may be utilized and that logical, mechanical and electrical changes may be made without departing from the spirit or scope of the invention. To avoid detail not necessary to enable those skilled in the art to practice the invention, the description may omit certain information known to those skilled in the art. The following detailed description is, therefore, not to be taken in a limiting sense, and the scope of the present invention is defined only by the appended claims.

Figure 1:
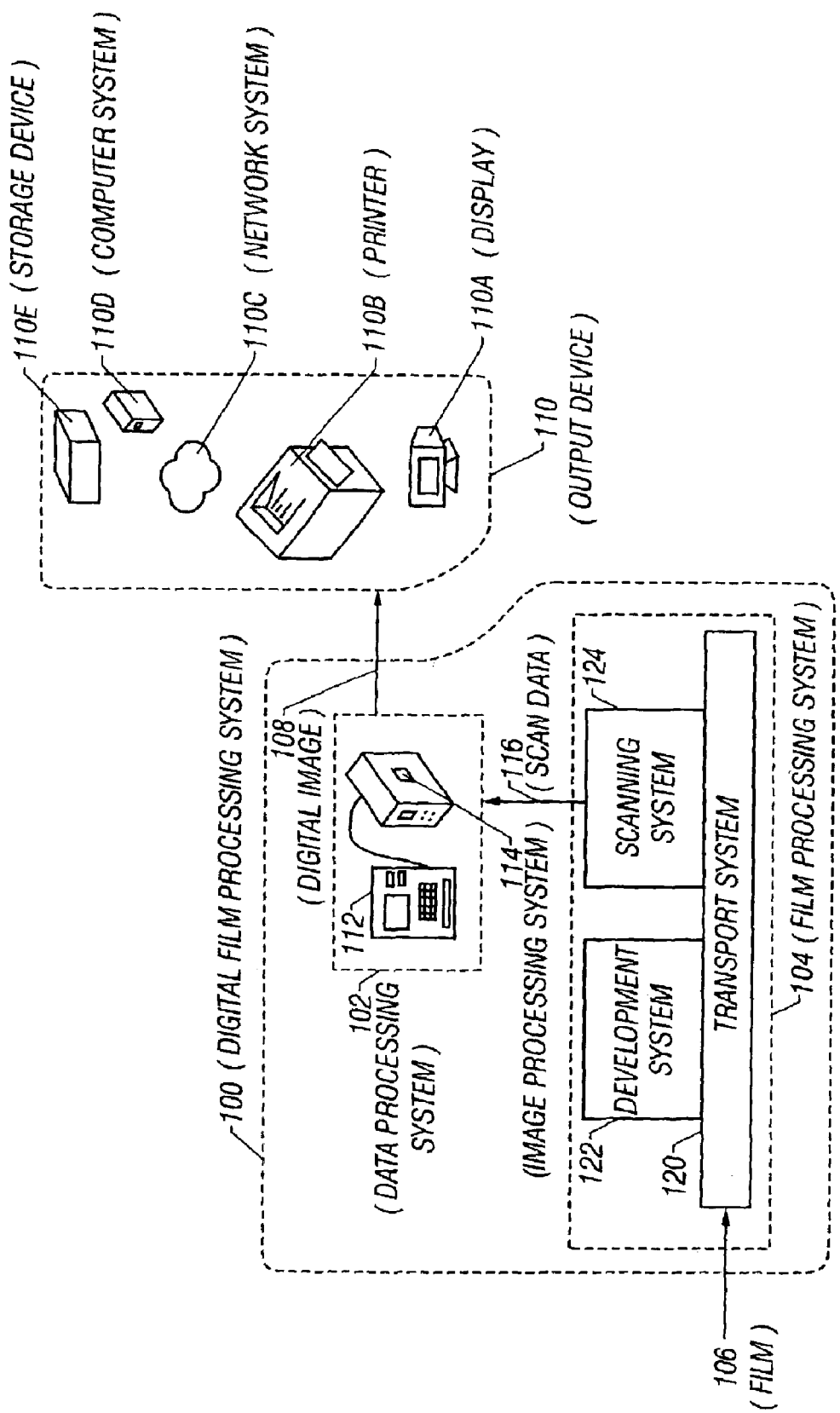
FIG. 1 is a block diagram of an improved digital film development system in accordance with the invention.

FIG. 1 is an example of one embodiment of a digital film development system 100. In this embodiment, the system 100 comprises a data processing system 102 and a film processing system 104 that operates to digitize a film 106 to produce a digital image 108 that can be output to an output device 110. Film 106, as used herein, includes color, black and white, x-ray, infrared or any other type of film and is not meant to refer to any specific type of film or a specific manufacturer.

Data processing system 102 comprises any type of computer or processor operable to process data. For example, data processing system 102 may comprise a personal computer manufactured by Apple Computing, Inc. of Cupertino, Calif., or International Business Machines of New York. Data processing system 102 may also comprise any number of computers or individual processors, such as application specific integrated circuits (ASICs). Data process system 102 may include a user interface 112 operable to allow a user to input information into the system 100. The user interface 112 generally includes a display and a printer, but may also include such input devices as a keypad, point-of-sale device, voice recognition system, memory reading device such as a flash card reader, or any other suitable data input device.

Data processing system 102 includes image processing software 114 resident on the data processing system 102. Data processing system 102 receives sensor data 116 from film processing system 104. As described in greater detail below, sensor data 116 is representative of the image data and silver in the film 106 at each discrete location, or pixel, of the film 106. The sensor data 116 is processed by image processing software 114 to produce the digital image 108. The specific embodiment of the image processing software 114 is dependent upon the embodiment of the film processing system 104, and in particular, the specific embodiment of the scanning system, as described below. In an embodiment in which metallic silver grains and/or silver halide remains within the film 106, the image processing software 114 operates to compensate for the silver in the film 106. For example, one embodiment of image processing software 114 comprises software based on U.S. patent application Ser. No. 08/999,421, entitled *Defect Channel Nulling*, which is incorporated herein by reference. In this embodiment, any silver remaining in the film 106 is treated as a defect and each individual pixel color record is compensated to remove the effect of the silver. In an embodiment in which the metallic silver grains and silver halide halve been modified to a substantially transparent silver compound, the film 106 may be scanned using only visible light without digitally compensating for any occlusions. Processing the film 106 without washing the silver from film 106 substantially reduces or eliminates the production of hazardous chemical effluents that are generally produced during conventional film processing methods. Although the image processing software 114 is described in terms of actual software, the image processing software 114 may be embodied as hardware, such as an ASIC. The color records for each pixel form the digital image 108, which is then communicated to one or more output devices 110.

Output device 110 may comprise any type or combination of suitable devices for displaying, storing, printing, transmitting or otherwise outputting the digital image 108. For example, as illustrated, output device 110 may comprise a monitor 110a, a printer 110b, a network system 110c, a mass storage device 110d, a computer system 110e, or any other suitable output device. Network system 118c may be any network system, such as the Internet, a local area network, and the like. Mass storage device 110d may be a magnetic or optical storage device, such as a floppy drive, hard drive, removable hard drive, optical drive, CD-ROM drive, and the like. Computer system 110e may be used to further process or enhance the digital image 108.

As described in greater detail below, film processing system 104 operates electronically scan the film 106 to produce the sensor data 116. Light used to scan the film 106 may include light within the visible portion of the electromagnetic spectrum, light within the infrared portion of the electromagnetic spectrum, a combination of visible and infrared light, or any other suitable electromagnetic radiation. As illustrated, film processing system 104 comprises a transport system 120, a development system 122, and a scanning system 124. Although the system 100 is illustrated with a development system 122, alternative embodiments of the system 100 do not require the development system 122. For example, film 106 may have been preprocessed and not require the development process described below.

Transport system 120 operates to dispense and move the film 106 through the film processing system 104. In a preferred embodiment, the transport system 120 comprises a leader transport system in which a leader is spliced to the film 106 and a series of rollers advances the film 106 through the film processing system 104, with care taken that the image surface of the film 106 is not contacted. Similar transport systems 120 are found in film products manufactured by, for example, Noritsu Koki Co. of Wakayama, Japan, and are available to those in the art.

Figure 2A:
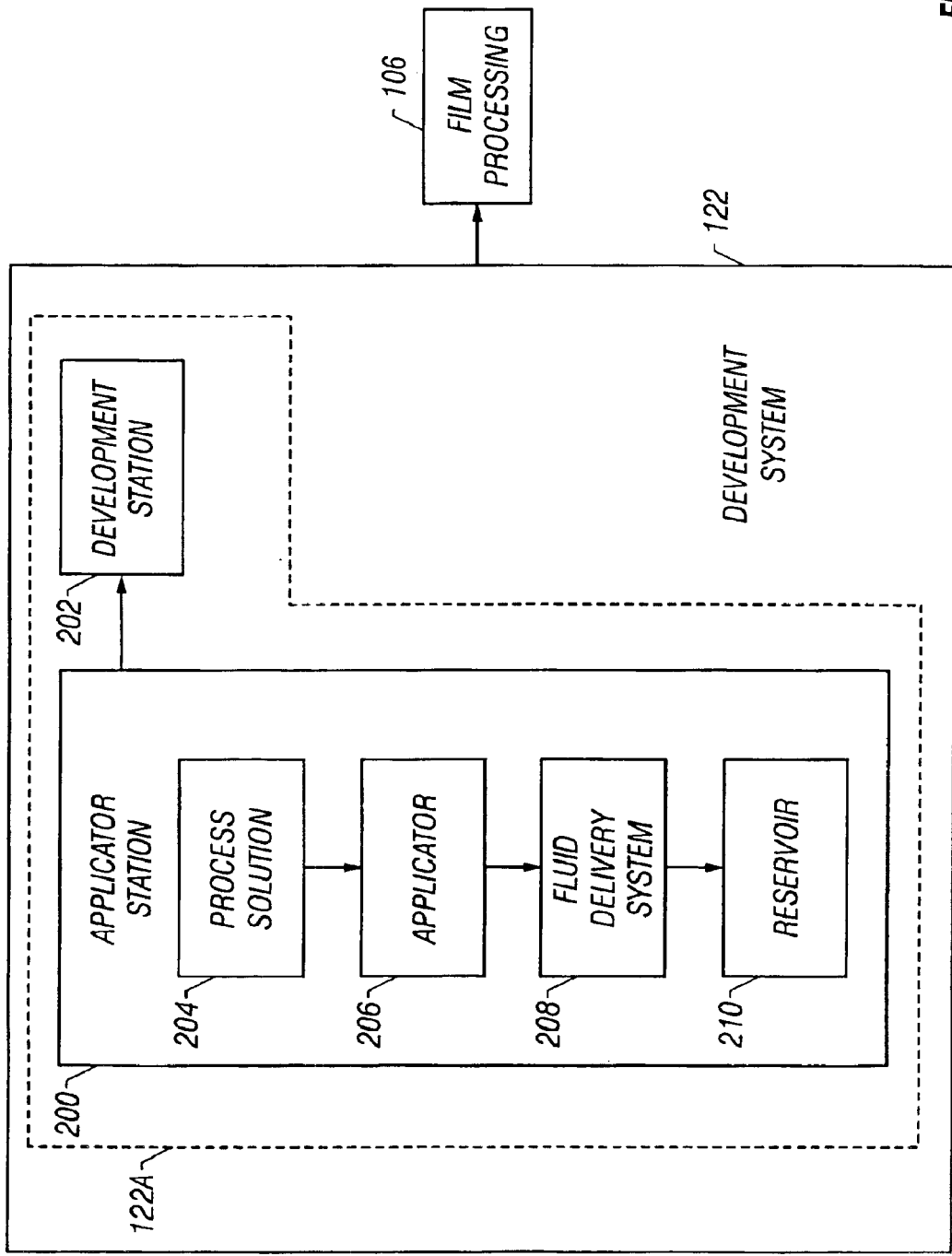
FIG. 2A is a block diagram illustrating a development system as shown in FIG. 1.

The development system 122 operates to apply one or more processing solutions to the film and develop the film 106, as described in greater detail in FIG. 2A. In the preferred embodiment, the processing solution comprises a viscous color developer solution that initiates production of the metallic silver grains and the magenta, cyan and yellow dye images within the film 106. In an alternative embodiment, the processing solution comprises a black and white developer solution that initiates production of the metallic silver grains within the film 106. The processing solution may include other suitable processing agents. The development system 122 may also apply other suitable processing solutions, such as a stop solution, inhibitors, accelerators, bleach solution, fixer solution, blix solution (combines the functionality of a bleach solution and a fixer solution), stabilizer solution and the like.

Figure 3A:
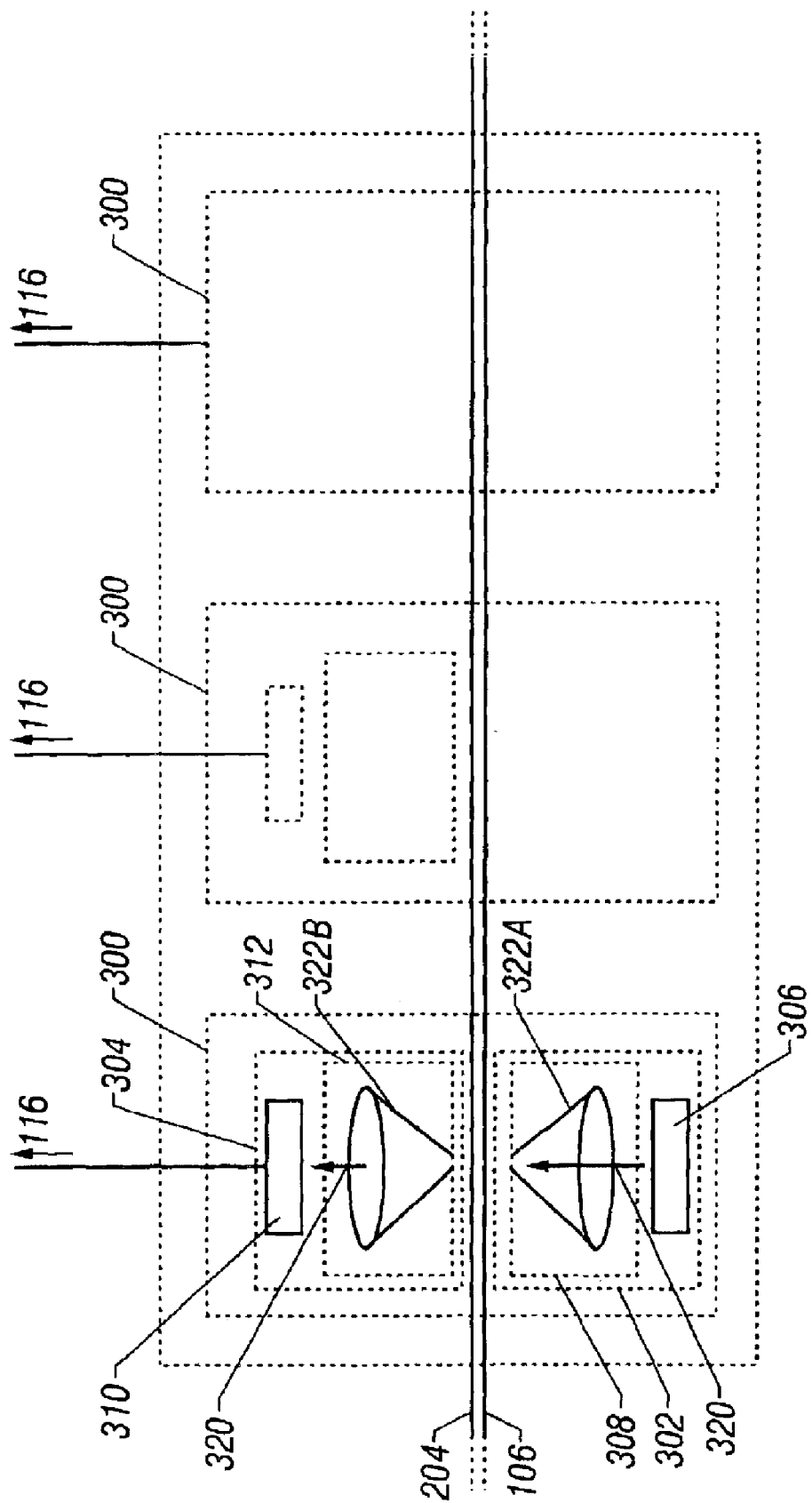
FIG. 3A is a block diagram illustrating a scanning system shown in FIG. 1.

The scanning system 124 scans the film 106 through the processing solutions applied to the film 106, as described in greater detail in FIG. 3A. In other words, the processing solutions are not substantially removed from the film 106 prior to the scanning process. In contrast, conventional film processing systems wash the contaminated processing solutions and hazardous silver compounds from the film and then dry the film to create a conventional film negative prior to any digitization process. The scanning station 124 may comprise a number of different configurations depending, in part, on how the film 106 was developed. In general, specific colors of visible light interact with the dye images and any silver present in the film 106, and infrared light interacts with the silver in the film 106. In some embodiments of the development system 122, the silver (metallic silver and/or silver halide) is modified to reduce the optical effects of the silver. For example, a bleaching agent may be applied to the film 106. The bleaching agent operates to oxidize the metallic silver grains within the film 106 to produce silver halide. The silver halide has a lower optical density than the metallic silver grains. As a result, a greater amount of light is transmitted through the film 106. Another example is a fixing agent. A fixing agent dissolves the silver halide to produce a silver compound that is substantially transparent to light. As a result, light is readily transmitted through the film 106.

The scanning station 124 scans the film 106 using electromagnetic radiation and produces sensor data 116 representative of the film image data, as described in greater detail in FIG. 3A. In the preferred embodiment of the scanning station 124, the film 106 is scanned with light within the visible and infrared portions of the electromagnetic spectrum. The visible light measures the light intensity associated with the dye clouds as well as the silver within the film 106, and the infrared light measures the light intensity associated with the metallic silver grains within the film 106. In particular, one or more bands of visible light may be used to scan the film 106. For example, the film 106 may be scanned using visible light within the red, green and/or blue portions of the electromagnetic radiation spectrum. In other embodiments of the scanning station 124, the film 104 is scanned with only visible light, with only infrared light, with different combinations of visible light, or any other suitable electromagnetic radiation. The processing solutions are not substantially removed prior to scanning the film 106. In contrast, conventional film processing systems wash all the processing solutions and silver, both silver halide and metallic silver, from the film 106 prior to any conventional scanning processes. Silver, whether metallic silver or silver halide crystals, in the film negative interferes with the transmission of light through the film negative and would be digitized along with the image. Any silver in the film negative appears as defects in the resulting digital image.

In operation, exposed, but undeveloped film 106 is fed into the transport system 120. The film 106 is transported through the development system 122. The development system 122 applies a processing solution to the film 106 that develops the film 106. The transport system 120 moves the film 106 through the scanning system 124. The scanning system 124 illuminates the film 106 with light. Light from the film 106 is measured by the sensor system, which produces sensor data 116. The sensor data 116 represents film image data in the film 106 at each pixel. The sensor data 116 is communicated to data processing system 102. The data processing system 102 processes the sensor data 116 using image processing software 114 to produce the digital image 108. The data processing system 102 may also operate to enhance or otherwise modify the digital image 108. For example, the digital image 108 may be modified in accordance with input from the user. The data processing system 102 communicates the digital image 108 to the output device 110 for viewing, storage, printing, communicating, or any combination of the above.

In a particular embodiment of the digital film development system 100 the system 100 is adapted to a self-service film processing system, such as a kiosk. Such a self-service film processing system is uniquely suited to new locations because no plumbing is required to operate the self-service film processing system. In addition, the developed images can be prescreened by the user before they are printed, thereby reducing costs and improving user satisfaction. In addition, the self-service film processing system can be packaged in a relatively small size to reduce the amount of floor space required. As a result of these advantages, a self-service film processing system can be located in hotels, college dorms, airports, copy centers, or any other suitable location. In other embodiments, the system 100 may be used for commercial film lab processing applications. Again, because there is no plumbing and the environmental impact of processing the film 106 is substantially reduced or eliminated, the installation cost and the legal liability for operating such a film lab is reduced. The system 100 can be adapted to any suitable application without departing from the scope and spirit of the invention.

FIG. 2A illustrates one embodiment of the development system 122. In this preferred embodiment, a development system 122*a* comprises an applicator station 200 and a development station 202. The applicator station 200 operates to apply a relatively uniform coating of a processing solution 204 to the film 106. In one embodiment, the processing solution 204 comprises a color developer solution, such as Flexicolor Developer for Process C-41 available from the Eastman Kodak Company. In other embodiments, the processing solution 204 comprises other suitable solutions. For example, the processing solution 204 may comprise a monobath solution that acts as a developer and stop solution.

The applicator station 200 generally includes an applicator 206, a fluid delivery system 208, and a reservoir 210. The reservoir 210 includes a sufficient volume of processing solution 204 to process multiple rolls of film 106. As described in greater detail below, the reservoir 210 is refillable or replaceable within the development system 122 and preferably comprises a closed system that substantially prevents air and other contaminates from contacting the processing solution 204. In the preferred embodiment, the reservoir 210 comprises a flexible bladder that collapses as the processing solution 204 is dispensed. In this manner, air is not introduced into the reservoir 210 and the processing solution 204 is not contaminated by the air or other contaminates.

The reservoir 210 generally includes a fluid level indicator for determining the quantity of processing solution 204 remaining within the reservoir 210 or when additional processing solution 204 is required. In the preferred embodiment, the fluid level indictor comprises an electronic device, such as an electronic programmable read only memory (EPROM) chip. In this embodiment, the EPROM chip tracks the quantity of processing solution 204 dispensed from the reservoir 210. In this manner, the timing for replenishing the reservoir 210 with processing solution 204, or replacing the reservoir 210 can be easily determined. In another embodiment, the fluid level indicator comprises a collapsible bellows within the fluid path between the reservoir 210 and the applicator 206. A sensor switch senses the collapsing bellows and activates a pump to refill the bellows from the reservoir 210. A reservoir sensor then senses when the fluid level of the reservoir 210 is low and activates an operator warning signal to have the reservoir 210 refilled. In this manner, the fluid path is primed with processing solution 204 at all times, even when being refilled. In yet another embodiment, the fluid level indicator comprises a spring activated lever that engages a collapsible bladder containing the processing solution 204. In this embodiment, the position of the lever is sensed and when reaching a certain position indicating a low level of processing solution 204, an operator warning signal is produced to have the reservoir 210 refilled or replaced. The fluid level indicator may comprise other suitable devices, such as a site glass, sand pipe indicator, metering system, and the like.

In an embodiment in which the reservoir 210 is permanently fixed within the development system 122, the reservoir 210 comprises a container that can be refilled with processing solution 204. In an embodiment in which the reservoir 210 is replaceably attached within the development system 122, the reservoir 210 preferably comprises a housing having an internal chamber operable to contain the processing solution 204. In this embodiment, the housing preferably includes one or more locating features that allows the reservoir 210 to be precisely located within the development system 122. The locating features may also be used to facilitate securing the reservoir 210 within the development system 122.

The fluid delivery system 208 communicates the processing solution 204 from the reservoir 210 to the applicator 206. The fluid delivery system 208 generally delivers the processing solution 204 at a constant volumetric flow rate to help insure uniformity of coating of processing solution 204 on the film 106. In the preferred embodiment, the fluid delivery system 208 comprises a peristaltic pump. In this embodiment, a tube filled with the processing solution 204 is compressed and the area of compression is moved to push the processing solution 204. This embodiment has the advantage that the processing solution 204 does not come into contact with any mechanical pumping device and a portion of the fluid delivery system comprises a portion of the fluid delivery system 208. In another embodiment, the fluid delivery system 208 includes a compressed air source that provides air to a sealed housing containing a collapsible bladder containing the processing solution 204. In this embodiment, the air pressure within the housing pressurizes the processing solution 204 to communicate the processing solution 204 from the reservoir 210 to the applicator 206. The fluid delivery system 208 may comprise other suitable pumping devices without departing from the invention. For example, the fluid delivery system 208 may comprise a piston operable to apply pressure to the reservoir 210, a centrifugal pump, a reciprocating pump, and the like.

The applicator 206 operates to apply processing solution 204 onto the film 106. In the preferred embodiment, the applicator 206 comprises a slot coat device operable to apply a coating of processing solution 204 onto the film 106. This embodiment is preferable because the processing solution 204 is applied evenly to allow scanning to take place through the coated film 106. The applicator 206 may comprise other suitable devices for applying the processing solution 204 to the film 106. For example, applicator 206 may comprise a fluid jet applicator, a drip applicator, and the like.

The applicator station 200 may further include a cleaning system operable to clean the applicator 206. In the preferred embodiment, the cleaning system includes a roll of a tape cleaner that contacts the applicator 206 as the applicator 206 pivots to wipe any excess processing solution 204 from the applicator 206. The tape cleaner absorbs the processing solution 204 and prevents the processing solution 204 from drying on the applicator 206. In another embodiment, the cleaning system operates in conjunction with the fluid delivery system 208. In this embodiment, the fluid delivery system 208 is reversed and any excess processing solution 204 is sucked back into the applicator 206.

The applicator station 200 may also include a capping station operable to substantially seal the applicator 206 when the applicator station 200 is not in use. As described earlier, air operates to dry and contaminate the processing solution 204. The capping station has the advantage of preventing air and other contaminates from entering the applicator 206. In the preferred embodiment, the applicator 206 pivots to contact a seal after the applicator 206 is cleaned by the cleaning system.

Figure 2B:
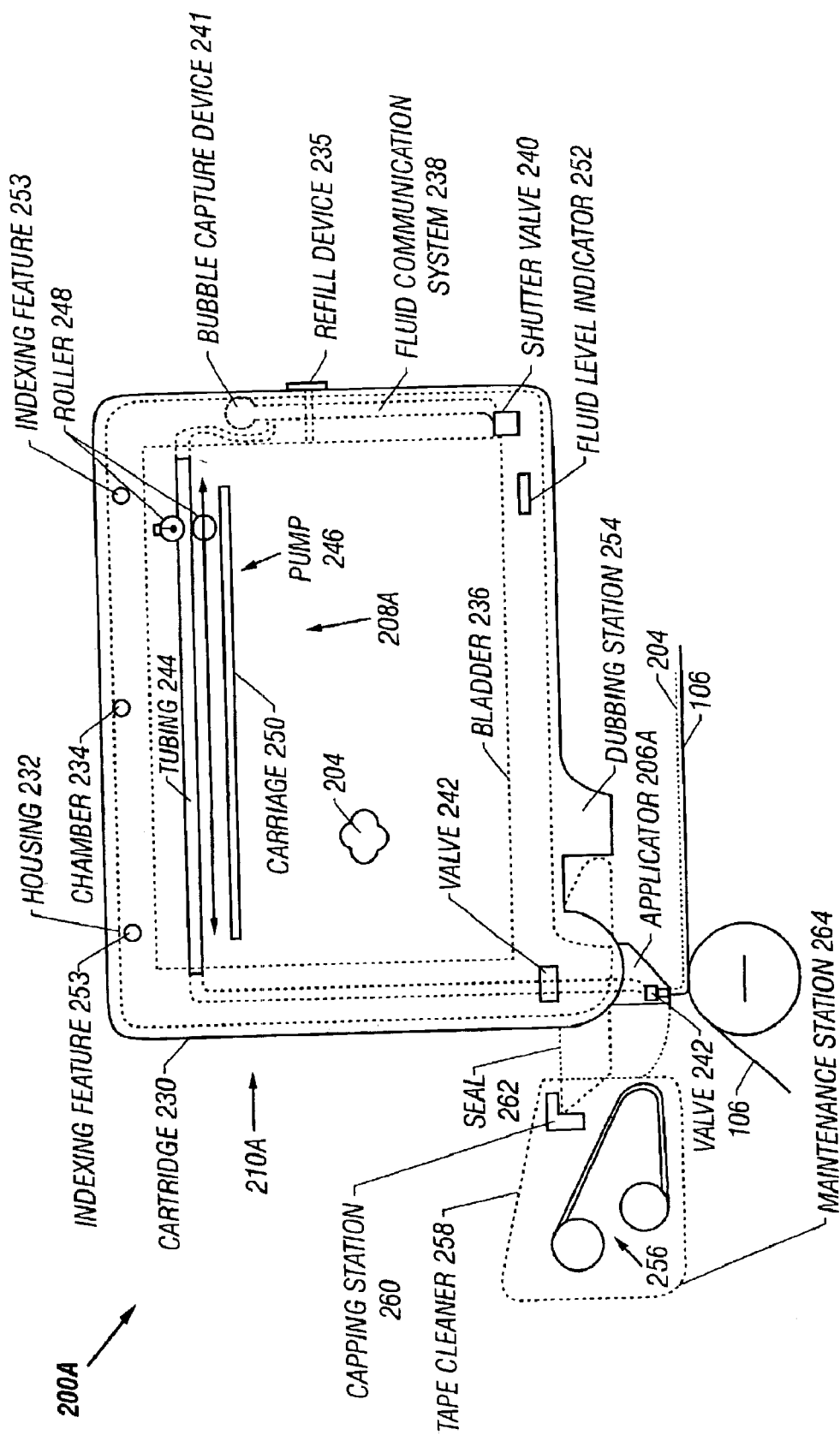
FIG. 2B is a side view in partial cross section of an applicator station incorporating a processing solution cartridge in accordance with the invention.

The applicator 206 and reservoir 210 are preferably integrated into a replaceable processing solution cartridge, as described in greater detail in FIG. 2B. In a particular embodiment, the applicator 206 is movably attached to the reservoir 210. In the preferred embodiment, the applicator 206 is pivotally attached to the reservoir 210. This embodiment allows the applicator 206 to be pivoted to contact the cleaning system and the capping station. An advantage of the replaceable processing solution cartridge is that the entire fluid path of the processing solution 204 is replaced at regular intervals. Similarly, the cleaning system and capping station may be integrated into a replaceable maintenance cartridge.

The applicator station 200 may comprise other suitable devices and systems without departing from the invention. The preferable embodiment of the applicator station 200 includes a processing solution cartridge as more fully described in FIG. 2B.

The development station 202 operates to give the film 106 time to develop prior to being scanned by the scanning system 124. In the embodiment illustrated, the development station 202 forms that portion of the transport system 120 between the applicator 206 and the scanning system 124.

The length of the development station 202 is generally dependent upon the development time of the film 106. In particular, depending upon the environment and chemical nature of the processing solution 204, development of the film 106 may require as little as a few seconds to as long as several minutes.

As illustrated, the development station 202 comprises a cover 212 that protects the film 106 during development. The cover 212 forms an environmental chamber 214 surrounding the film 106. The temperature and humidity within the environmental chamber 214 are strictly controlled. To facilitate controlling the temperature and humidity, the environmental chamber 214 has a minimum volume surrounding the film 106. The cover 212 maybe insulated to maintain a substantially constant temperature as the film 106 is developed. In order to maintain the temperature, the development station 202 preferably includes a heating system 216. As illustrated, the heating system 216 may include a heated roller 218 and heating element 220. In addition, the heating system 216 may include a processing solution heating system (not expressly shown) that heats the processing solution 204 prior to its application to the film 106.

Figures 2, 2C:
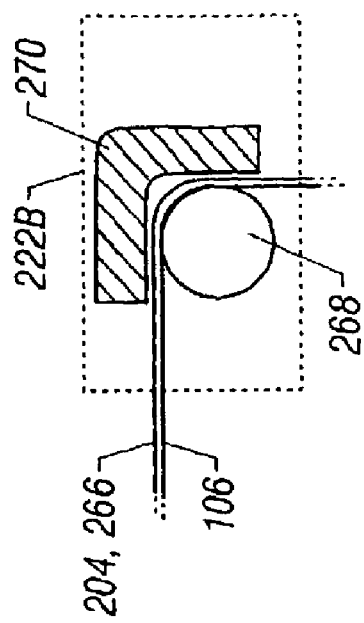
Figures 1, 2C:
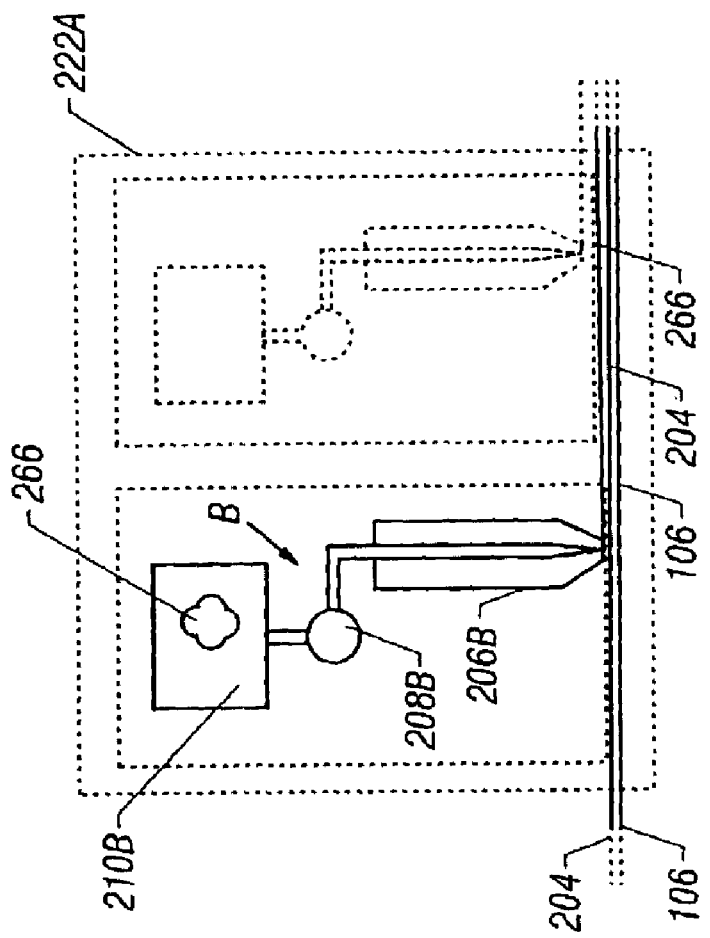

In an alternative embodiment, the development system 122 includes a processing station 222. The processing station 222 operates to further process the film 106 prior to being scanned by the scanning system 124. For example, in on embodiment, the processing station 222 operates to modify the metallic silver grains and or silver halide in the film 106. Modifying the silver within the film 106 decreases the opacity of the film 106, thereby improving the transmissivity of light through the film 106. In another embodiment, the processing station 222 operates to retard or substantially reduce the continued development of the film 106. Retarding or substantially stopping the continued development of the film 106 increases the amount of time the film 106 can be exposed to visible light without substantially fogging of the film 106. In another embodiment, the processing station 222 operates to modify the silver and also substantially reduce the continued development of the film 106. FIGS. 2C-1–2C4 illustrate different examples of the processing station 221.

In operation, transport system 120 transports the film 106 through the applicator station 200. Fluid delivery system 208 dispenses the processing solution 204 from the reservoir 210 through the applicator 206 onto the film 106. The processing solution 204 initiates development of the dye image and silver image within the film 106. The coated film 106 is then transported through the development station 202. As discussed above, the development station 202 allows the film 106 time to develop within a controlled environment. In an alternative embodiment, the film 106 is then transported through the processing station 222 where the film 106 is further processed. The film 106 is then transported by the transport system 120 to the scanning system 124. As described above, the processing solution 204 coated on the film 106 is not removed, but remains on the film 106 as the film 106 is transported to the scanning system 124.

FIG. 2B illustrates an applicator station 200a incorporating a replaceable processing solution cartridge 230. In one embodiment, the cartridge 230 comprises a housing 232 and a chamber 234 operable to contain the processing solution 204. The housing 232 is generally fabricated in multiple pieces that are fastened together. The housing 232 is preferably fabricated from an injection molded plastic, such as an ABS, PVC, Polypropylenes, and polystyrene.

The housing 232 may include one or more locating features 233 that match complementary features (not expressly shown) within the applicator station 200a. The locating features 233 facilitate the installation of the cartridge 230 into the development system 122 and operate to reduce installation errors by operators. The locating features 233 may also operate to secure the cartridge 230 within the applicator station 200a. The chamber 234 contains a sufficient quantity of processing solution 204 to coat multiple rolls of film 106. In a particular embodiment, the cartridge 230 includes a refill device 235 that allows the cartridge 230 to be refilled with processing solution 204.

In a particular embodiment, the cartridge 230 also includes a collapsible bladder 236 disposed within the chamber 234. The collapsible bladder 236 contains the processing solution 204 and removes the need for the housing 232 to be a sealed container. The collapsible bladder 236 also allows the cartridge 230 to be easily recycled by replacing a collapsed bladder 236 with a full collapsible bladder 236.

In yet another embodiment, the cartridge 230 also includes a fluid communication system 238. The fluid communication system 238 communicates the processing solution 204 from the chamber 234 to the applicator 206. The fluid communication system 238 generally comprises flexible tubing. In a particular embodiment, the fluid communication system 238 includes a shuttle valve 240. In this embodiment, the shuttle valve 240 opens to allow the processing solution 204 to flow through the fluid communication system 238 when the cartridge 230 is installed in the development system 122. This provides a safety feature to prevent the premature or accidental discharge of the processing solution 204. The fluid communication system 238 may also include a bubble capture device 241. An air bubble communicated to the applicator 206 results in a discontinuity of the processing solution 204 coated onto the film 106. Discontinuities may cause imperfections in the development of the film 106. The bubble capture device 241 operates to prevent air bubbles from being communicated to the applicator 206. The fluid communication system 238 may also include a valve 242 proximate the applicator 206. The valve 242 is generally a unidirectional valve that operates to prevent contaminates or the processing solution 204 from entering the fluid communication system 238.

In the preferred embodiment of the cartridge 230, the fluid communication system 238 includes tubing 244 that can be acted upon by a peristaltic pump 246. The peristaltic pump 246 generally forms a portion of the applicator station 200a, but does not form a portion of the cartridge 230. As illustrated, the peristaltic pump 246 comprises a rollers 248 coupled to a carriage 250. The rollers 248 operate to compress the tubing 244 and the carriage 250 moves parallel to the tubing 244. As illustrated, to pump the processing solution 204 from the chamber 234 toward the applicator 206, the carriage 250 is in a far right position and rollers 248 compress the tubing 244. While the rollers 248 maintain compression of the tubing 244, the carriage 250 moves toward to left, thereby pushing the processing solution 204 toward the applicator 206. Upon reaching the far left position, the rollers 248 release the tubing 244 and the carriage 250 moves the rollers 248 back toward the far right position. In the preferred embodiment, the quantity of processing solution 204 dispensed by a single cycle of the peristaltic pump 246 corresponds generally to the quantity of processing solution 204 needed to process a single roll of film 106.

The cartridge 230 may include a fluid level indicator 252. In the preferred embodiment, the fluid level indicator 252 comprises an electronic device, such as an EPROM. In an embodiment using a peristaltic pump 246, the EPROM can be continuously updated with information relating to how many cycles the peristaltic pump. 246 has been activated, and accordingly the quantity of processing solution 204 remaining within the cartridge 230. This embodiment also allows the cartridge 230 to be removed and reinstalled without losing the fill data. The fluid level indicator 252 may comprise other suitable devices without departing from the invention.

The cartridge 230 may also include an integral applicator 206a. In the preferred embodiment, the applicator 206a is pivotally coupled to the housing 232. In particular, the cartridge 230 may include docking station 254. In the preferred embodiment, the docking station 254 allows the applicator 206a to be locked in place during shipment of the cartridge 230, thereby reducing the possibility of damaging the applicator 206a. Although the applicator 206a is illustrated as being pivotally attached to the housing 232, the applicator 206a may be otherwise suitably coupled to the housing 232. For example, the applicator 206a may be fixed to the housing 232, slidably attached to the housing 232, or otherwise suitably attached to the housing 232.

The applicator station 200a may include a cleaner system 256 operable to clean the applicator 206a. In the preferred embodiment, the cleaner system 256 comprises a tape cleaner 258 having a roll of absorbent material. In this embodiment, the applicator 206a pivotally engages the tape cleaner 258 and wipes any excess processing solution 204 from the applicator 206a. The absorbent material advances after cleaning the applicator 206a.

The applicator station 200a may further include a capping station 260 operable to substantially seal the applicator 206a when the system 100 is not in use. In the preferred embodiment, the capping station 260 comprises an absorbent seal 262 operable to pivotally engage the applicator 206a. The applicator 206a generally engages the capping station 260 after being cleaned by the cleaner system 256. The capping station 260 may comprise other suitable devices for substantially sealing the applicator 206a between periods of use.

In the preferred embodiment, the cleaner system 256 and capping station 260 are integrated into a single maintenance cartridge 264. This allows simple replacement of the cleaner system 256 and replenishment of the tape cleaner 258. Similar to the processing solution cartridge 230, the maintenance cartridge 264 may be fabricated from injection molded plastic components fastened together with the components for the cleaner system 256 and the capping station 260. The maintenance cartridge 264 may comprise other suitable devices without departing from the scope of the present invention.

FIG. 2C-1 illustrates a processing station 222a that operates to apply one or more processing solutions 266 to the film 106. As illustrated, the processing station 222a comprises an applicator 206b, a fluid delivery system 208b, and a reservoir 210b, similar in function and design as applicator station 200 described in FIG. 2A. Although a single applicator 206b, fluid delivery system 208b, and reservoir 210b is illustrated, the processing station 222a may comprise any number of applicators 206b, fluid delivery systems 208b, and reservoirs 210b that apply other suitable processing solutions 266 and other suitable solutions.

The processing solution 266 may comprise any suitable chemical applied to the film 106 to further process the film 106. In one embodiment, the processing solution 266 includes a fixer solution. As discussed previously, the fixer solution dissolves the silver halide into a substantially transparent silver compound. This has the effect of slightly reducing the opacity of the film 106, but substantially eliminating the sensitivity of the film 106 to any type of light. In another embodiment, the processing solution 266 includes a bleaching agent. The bleaching agent converts the metallic silver within the film 106 into silver halide. As a result, the opacity of the film 106 is greatly reduced, but the sensitivity of the film 106 to light is not substantially reduced. In yet another embodiment, both a bleaching agent and a fixing agent are applied to the film 106, or a single blix solution (combines functions of a bleaching agent and fixing agent). This has the effect of substantially reducing the opacity of the film 106 and also substantially reducing the sensitivity of the film 106 to light. The processing solution 266 may also include an aqueous solution, stopping agents, stabilizing agents, or any other suitable film processing agent or solutions without departing from the scope of the invention.

FIG. 2C-2 illustrates a processing station 222b that operates to chill the developing film 106. Chilling the developing film 106 substantially slows the chemical developing action of the processing solution 204. In the embodiment illustrated, the processing station 222b comprises an electrical cooling roller 268 and insulation shield 270. In this embodiment, the cooling roller 268 is electronically maintained at a cool temperature that substantially arrests the chemical reaction of the processing solution 204. The insulation shield 270 substantially reduces the heat transfer to the cooling roller 268. The processing station 222b may comprise any other suitable system and device for chilling the developing film 106.

Figures 2, 2C, 3:
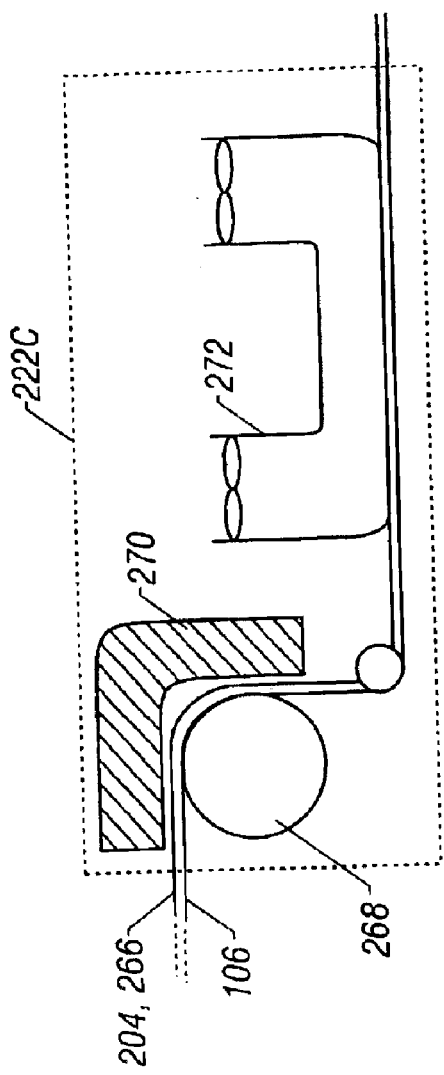
Figures 2, 2C, 3, 4:
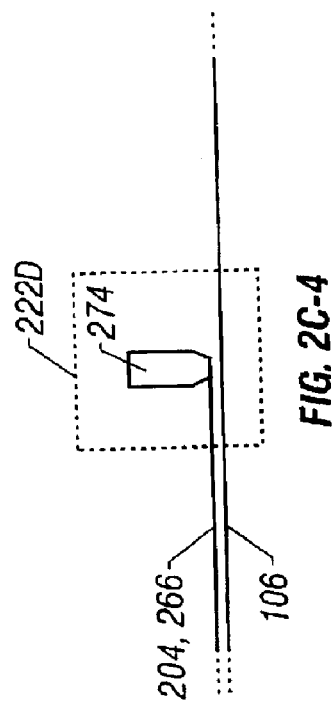

FIG. 2C-3 illustrates a processing station 222c that operates to dry the processing solution 204 on the coated film 106. Drying the processing solution 204 substantially stops further development of the film 106 and may also decrease the opacity of the film 106. In the embodiment illustrated, the processing station 222c comprises an optional cooling roller 268, as described in FIG. 2C-2, and a drying system 272. Although heating the coated film 106 would facilitate drying the processing solution 204, the higher temperature would also have the effect of accelerating the chemical reaction of the processing solution 204 and film 106. Accordingly, in the preferred embodiment, the film 106 is cooled to retard the chemical action of the processing solution 204 and then dried to effectively freeze-dry the coated film 106. Although chilling the film 106 is preferred, heating the film 106 to dry the film 106 can also be accomplished by incorporating the accelerated action of the developer solution 204 into the development time for the film 106. In another embodiment in which a suitable processing solution 266 is applied to the film 106, the chemical action of the processing solution 204 is already minimized and the film 106 can be dried using heat without substantially effecting the development of the film 106. As illustrated, the drying system 272 circulates air over the film 106 to dry the processing solution 204 and depending upon the embodiment, the processing solution 266. The processing station 222c may comprise any other suitable system for drying the film 106.

FIG. 2C-4 illustrates a processing station 222d that operates to substantially remove excess processing solution 204, and any excess processing solution 266, from the film 106. The processing station 222d does not remove the solutions 204, 266 that are absorbed into the film 106. In other words, even after the wiping action, the film 106 includes some processing solutions 204, 266. Removing any excess processing solution 204 will retard the continued development of the film 106. In addition, wiping any excess processing solutions 204, 266 from the film 106 may improve the light reflectance and transmissivity properties of the coated film 106. In particular, removal of the excess processing solutions 204, 266. May reduce surface irregularities in the coating surface, which can degrade the scanning operation. In the embodiment illustrated, the processing station 222d comprises a wiper 274 operable to substantially remove excess processing solution 204 and any processing solution 266. In a particular embodiment, the wiper 274 includes an absorbent material that wicks away the excess processing solutions 204, 266. In another embodiment, the wiper 274 comprises a squeegee that mechanically removes substantially all the excess processing solutions 204, 266. The processing station 222d may comprise any suitable device or system operable to substantially remove any excess processing solutions 204, 266.

Although specific embodiments of the processing station 222 have been described above, the processing station 222 may comprise any suitable device or system for further processing the film 106. In particular, the processing station 222 may comprise any suitable combination of the above embodiments. For example, the processing station 222 may comprise an applicator station 200b for applying a processing solution 224, a cooling roller 268, and a drying system 272. As another example, the processing station 222 may comprise a wiper 274 and a drying system 272.

FIG. 3A is a diagram of the scanning system 124. Scanning system 124 comprises one or more scanning stations 300. Individual scanning stations 300 may have the same or different architectures and embodiments. Each scanning station 300 comprises a lighting system 302 and a sensor system 304. The lighting system 302 includes one or more light sources 306 and optional optics 308. The sensor system 304 includes one or more detectors 310 and optional optics 312. In operation, the lighting system 302 operates to produce suitable light 320 that is directed onto the film 106. The sensor system 304 operates to measure the light 320 from the film 106 and produce sensor data 116 that is communicated to the to the data processing system 102.

Each scanning station 300 utilizes electromagnetic radiation, i.e., light, to scan the film 106. Individual scanning stations 300 may have different architectures and scan the film 106 using different colors, or frequency bands (wavelengths), and color combination. In particular, different colors of light interact differently with the film 106 Visible light interacts with the dye image and silver within the film 106. Whereas, infrared light interacts with the silver, but the dye image is generally transparent to infrared light. The term "color" is used to generally describe specific frequency bands of electromagnetic radiation, including visible and non-visible light.

Visible light, as used herein, means electromagnetic radiation having a wavelength or band generally within the electromagnetic spectrum of near infrared light (>700 nm) to near ultraviolet light (<400 nm). Visible light can be separated into specific bandwidths. For example, the color red is generally associated with light within a frequency band of approximately 600 nm to 700 nm, the color green is generally associated with light within a frequency band of approximately 500 nm to 600 nm, and the color blue is generally associated with light having a wavelength of approximately 400 nm to 500 nm. Near infrared light is generally associated with radiation having a wavelength of approximately 700 nm to 1500 nm. Although specific colors and wavelengths are described herein, the scanning station 300 may utilize other suitable colors and wavelengths (frequency) ranges without departing from the spirit and scope of the invention.

The light source 306 may comprise one or more devices or a system that produces suitable light 320. In the preferred embodiment, the light source 306 comprises an array of light-emitting diodes (LEDs). In this embodiment, different LEDs within the array may be used to produce different colors of light 320, including infrared light. In particular, specific colors of LEDs can be controlled to produce short duration pulses of light 320. In another embodiment, the light source 306 comprises a broad spectrum light source 306, such as a fluorescent, incandescent, tungsten-halogen, direct gas discharge lamps, and the like. In this embodiment, the sensor system 304 may include filters for spectrally separating the colors of light 320 from the film 106. For example, as described below, a RGB filtered trilinear array of detectors may be used to spectrally separate the light 320 from the film 106. In another embodiment of a broad-spectrum light source, the light source 306 includes a filter, such as a color wheel, to produce the specified colors of light 320. In yet another embodiment, the light source 306 comprises a point light source, such as a laser. For example, the point light source may be a gallium arsenide or an indium gallium phosphide laser. In this embodiment, the width of the laser beam is preferably the same size as a pixel on the film 106 (~12 microns). Filters, such as a color wheel, or other suitable wavelength modifiers or limiters maybe used to provide the specified color or colors of light 320.

Optional optics 308 for the lighting system 302 directs the light 320 to the film 106. In the preferred embodiment, the optics 308 comprises a waveguide that directs the light 320 onto the film 106. In other embodiment, the optics 320 includes a lens system for focusing the light 320. In a particular embodiment, the lens system includes a polarizing filter to condition the light 320. The optics 308 may also include a light baffle 322a. The light baffle 322a constrains illumination of the light 320 within a scan area in order to reduce light leakage that could cause fogging of the film 106. In one embodiment, the light baffle 322a comprises a coated member adjacent the film 106. The coating is generally a light absorbing material to prevent reflecting light 320 that could cause fogging of the film 106.

The detector 310 comprises one or more photodetectors that convert light 320 from the film 106 into data signals 116. In the preferred embodiment, the detector 310 comprises a linear charge coupled device (CCD) array. In another embodiment the detector 310 comprises an area array. The detector 310 may also comprise a photodiode, phototransistor, photoresistor, and the like. In addition, the detector 310 may utilize time delay integration (TDI) to improve the accuracy detector 310. The detector 310 may include filters to limit the bandwidth, or color, detected by individual photodetectors. For example, a trilinear array often includes separate lines of photodetectors with each line of photodetectors having a color filter to allow only one color of light to be measured by the photodetector. Specifically, in a trilinear array, the array generally includes individual red, green, and blue filters over separate lines in the array. This allows the simultaneous measurement of red, green, and blue components of the light 320. Other suitable types of filters may be used. For example, a hot mirror and a cold mirror can be used to separate infrared light from visible light.

Optional optics 312 for the sensor system 304 directs the light 320 from the film 106 onto the detector 310. In the preferred embodiment, the optics 312 comprises a lens system that directs the light 320 from the film 106 onto the detector 310. In a particular embodiment, the optics 312 include polarized lenses. The optics 312 may also include a light baffle 322b. The light baffle 322b is similar in function to light baffle 322a to help prevent fogging of the film 106.

As discussed previously, individual scanning stations 300 may have different architectures. For example, light 320 sensed by the sensor system 304 may be transmitted light or reflected light. Light 320 reflected from the film 106 is generally representative of the emulsion layer on the same side of the film 106 as the sensor system 304. Specifically, light 320 reflected from the front side (emulsion side) of the film 106 represents the blue sensitive layer and light 320 reflected from the back side of the film 106 represents the red sensitive layer. Light 320 transmitted through the film 106 collects information from all layers of the film 106. Different colors of light 320 are used to measure different characteristics of the film 106. For example, visible light interacts with the dye image and silver within the film 106, and infrared light interacts with the silver in the film 106.

Different architectures and embodiments of the scanning station 300 may scan the film 106 differently. In particular, the lighting system 302 and sensor system 304 operate in concert to illuminate and sense the light 320 from the film 106 to produce suitable sensor data 116. In one embodiment, the lighting system 302 separately applies distinct colors of light 320 to the film 106. In this embodiment, the sensor system 304 generally comprises a non-filtered detector 310 that measures in series the corresponding colors of light 320 from the film 106. In another embodiment, multiple unique color combinations are simultaneously applied to the film 106, and individual color records are derived from the sensor data 116. In another embodiment, the lighting system 302 simultaneously applies multiple colors of light 320 to the film 106. In this embodiment, the sensor system 304 generally comprises a filtered detector 310 that allows the simultaneous measurement of individual colors of light 320. Other suitable scanning methods may be used to obtain the required color records.

The use of the processing station 222 may improve the scanning properties of the film 106 in addition to retarding or substantially stopping the continued development of the film 106. For example, the amount of light 320 transmitted through the film 106 is negatively affected by the opacity of the film 106. In other words, the greater the opacity of the film 106 the lower the amount of light 320 transmitted through the film 106. Both the silver image and silver halide within the film 106 occlude light 320. On the whole, the silver image within the film 106 absorbs light 320, and the silver halide reflects light 320. As described above, the processing solutions 224 may be used to modify opacity of the film 106 and improve the scanning properties of the film 106.

Specific examples of scanner station 300 architectures are illustrated in FIGS. 3B–3E. The scanning system 124 may comprise any illustrated example, combination of examples, or other suitable methods or systems for scanning the film 106 without departing from the scope and spirit of the invention.

Figures 3, 3B:
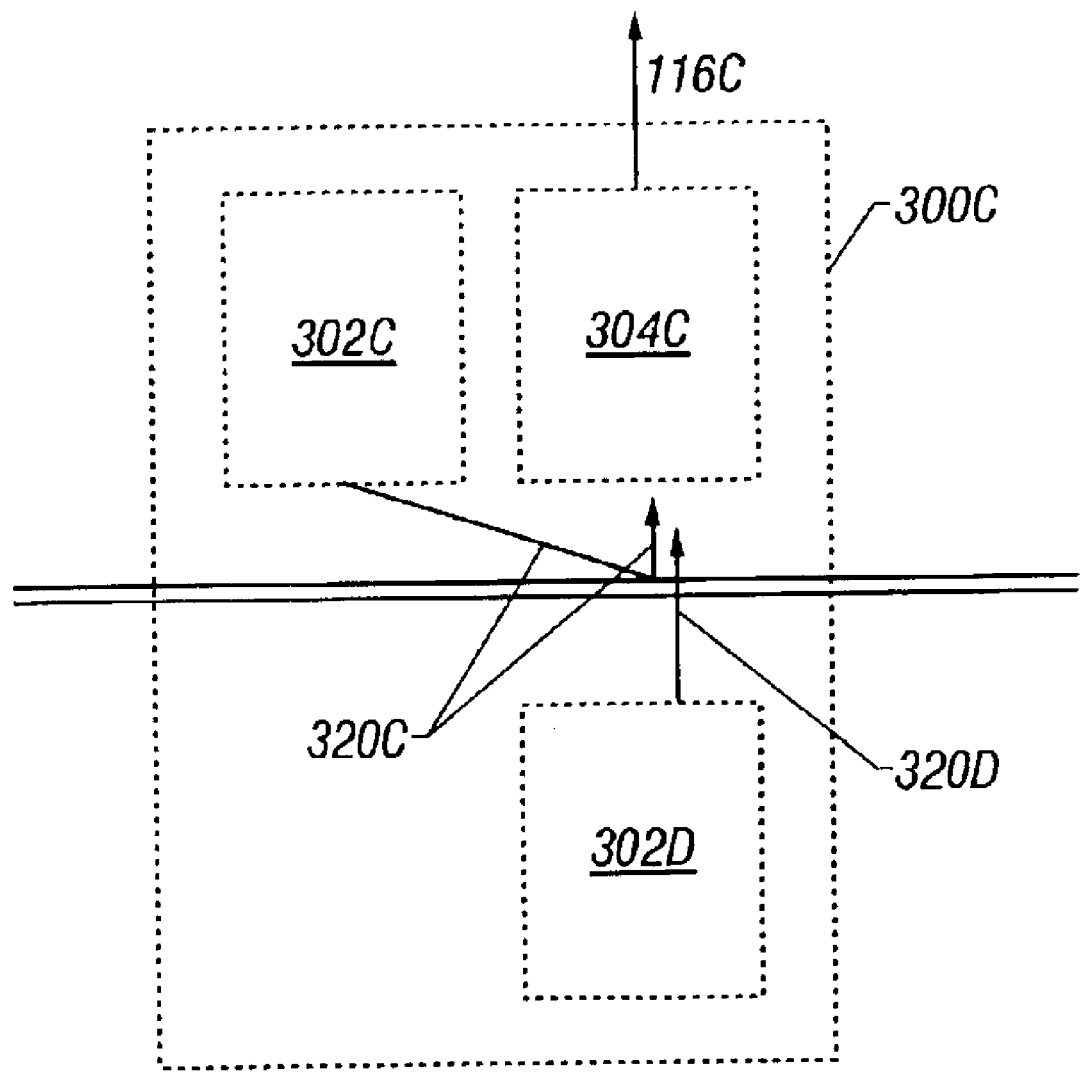
Figures 3, 3B, 4:
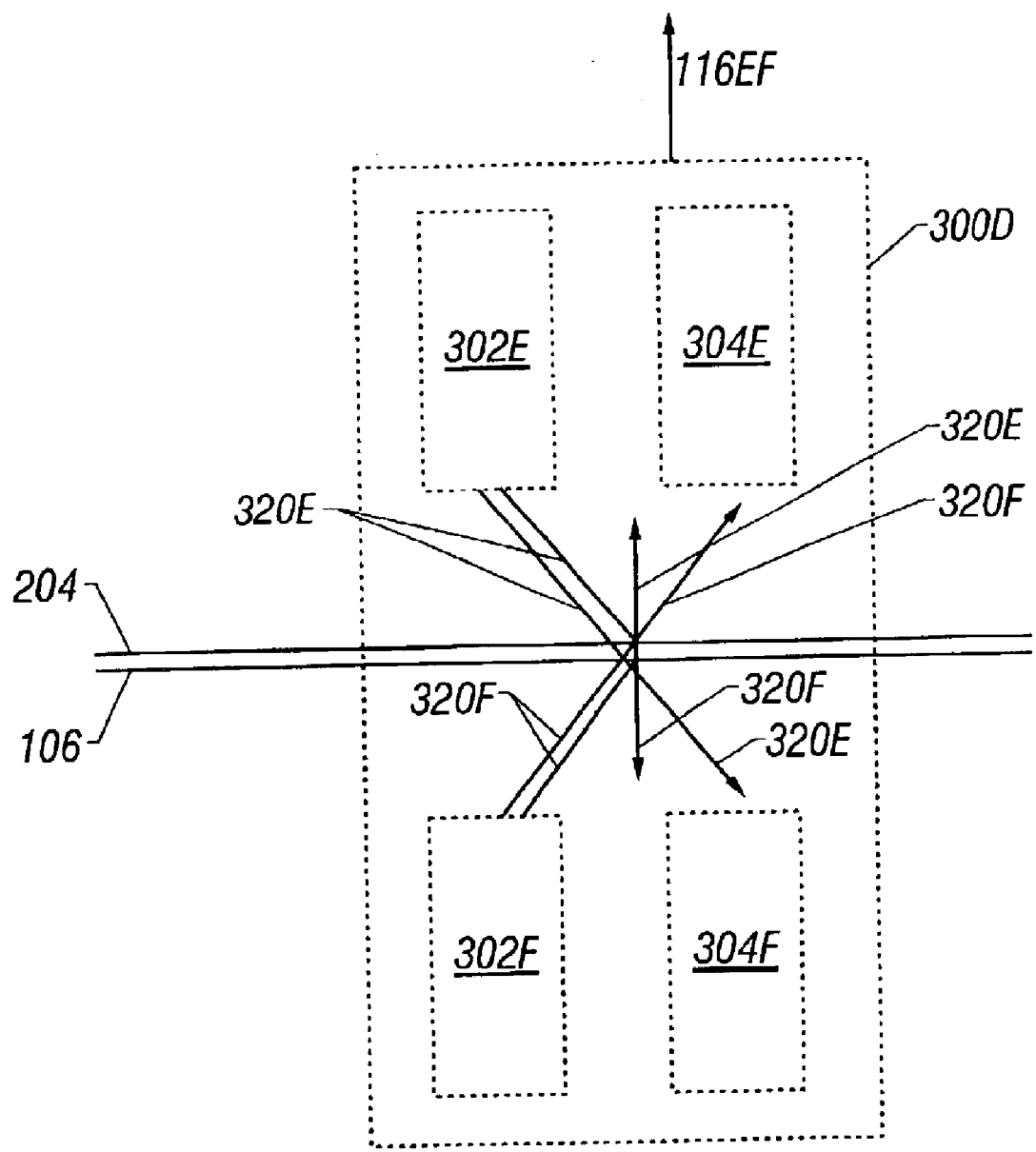

FIG. 3B is a schematic diagram illustrating a scanning station 300a having a transmission architecture. As illustrated, the transmission scanning station 300a comprises a lighting system 302a and a sensor system 304a. Lighting system 302a produces light 320a that is transmitted through the film 106 and measured by the sensor system 304a. The sensor system 304a produces sensor data 116a that is communicated to the data processing system 102.

Lighting system 302a and sensor system 304a are similar in design and function as lighting system 302 and sensor system 304, respectively. The visible light 320a may comprise broadband visible light, individual visible light colors, or combinations of visible light colors. In an embodiment in which the light 320a comprises broadband visible light, the sensor system 304a will preferably comprise a red, green and blue trilinear array. In this embodiment, the sensor system 304a can simultaneously measure the red, green and blue components of light 320a from the film 106. In another embodiment, the light 320a comprises pulses of red, green and blue light, and the sensor system 304a preferably comprises an unfiltered detector operable to measure the pulses of light 320a from the film 106. In this embodiment, the color of the light 320a changes and the sensor system 304a measures the respective light pulses from the film 106.

In one embodiment of the scanning station 300a, the light 320a produced by the lighting system 302a comprises visible light. The visible light 320a interacts with at least one dye cloud within the film 106 and any silver occlusions contained in the film 106. In particular, depending upon the embodiment of the development system 122, the film 106 may include silver forming an optical occlusion, such as metallic silver grains, silver halide, or both, but does not include silver compounds formed as a result of fixing the silver halide contained within the film 106.

The visible light 320a interacts with the magenta, cyan and yellow dye images within the film 106, as well as any silver occlusions within the film 106, the sensor system 304a records the intensity of visible light 320a from the film 106 and produces sensor data 116a. The sensor data 116a generally comprises a red, green, and blue record corresponding to the cyan, magenta, and yellow dye images, respectively. Depending upon the development process, each of the red, green, and blue records may include a silver record. Specifically, any metallic silver grains or silver halide within the film 106 partially occludes the visible light 320a transmitted through the film 106. Depending upon the severity of the occlusions, the red, green, and blue records are processed by the data processing system 102 to correct for the occlusion in the film 106.

In the preferred embodiment of the transmission scanning station 300a, the light 320a produced by the lighting system 302a comprises visible light and infrared light. As discussed above, the visible light may comprise broadband visible light, individual visible light colors, or combinations of visible light colors. The infrared light may comprise infrared, near infrared, or any suitable combination thereof. The visible light 320a interacts with the dye images, i.e. cyan, magenta, or yellow, within the film 106 and any silver to produce a red, green, and/or blue record that includes a silver record. The infrared light interacts with the silver, and any other occlusions, within the film 106 and produces a silver record. The silver record can then be used to remove, at least in part, the effects of the occlusions contained in the red, green, and blue records. This embodiment is analogous to the defect correction electronic scanners described in U.S. Pat. No. 5,266,805, entitled *System and Method for Image Recovery*, which is hereby incorporated herein by reference. In this embodiment, any occlusions within the film are analogous to defects that obstruct the optical path of the infrared light. The degree of occlusion is used as a basis for modifying the color records. For example, in pixels having a high occlusion density, the individual color records are significantly increased, whereas in pixels having a low occlusion density, the individual color records are relatively unchanged.

In yet another embodiment of the transmission scanning station 300a, the light produced by the lighting system 302a comprises only infrared and/or near infrared light. In this embodiment, the infrared light 320a interacts with occlusions within the film 106 but does not substantially interact with the dye images within the film 106. In this embodiment, the sensor data 116a does not spectrally distinguish the magenta, cyan, and yellow dye images. An advantage of this embodiment is that the infrared light 320a does not fog the film 106. In a particular embodiment, the advantage of not fogging the film 106 allows the film 106 to be scanned at multiple development times without significantly fogging the film 106. In this embodiment, the scanning station 300a can be used to determine the optimal development time for the film 106. This embodiment may also be used to scan the silver image.

FIG. 3B illustrates the light 320a being transmitted through the film 106 from the backside to the frontside of the film 106. The light 320a can also be transmitted through the film 106 from the frontside to the backside of the film 106 without departing from the scope of the invention.

FIG. 3C is a schematic diagram illustrating a scanning station 300b having a reflection architecture. The reflective scanning station 300b comprises a lighting system 302b and a sensor system 304b. Lighting system 302b produces light 320b that is reflected from the film 106 and measured by the sensor system 304b. The scanning station 300b generally requires silver halide to be present within the film 106. The silver halide scatters and reflects the light 320b measured by the sensor system 304b. The sensor system 304b produces sensor data 116b that is communicated to the data processing system 102. Lighting system 302b and sensor system 304b are similar to lighting system 302 and sensor system 304, respectively.

In one embodiment of the reflective scanning station 300b used to scan the blue emulsion layer of the film 106, the light 320b produced by the lighting system 302b comprises blue light. In this embodiment, the blue light 320b scans the silver and dye image within the blue layer of the film 106. The blue light 320b interacts with the yellow dye image and also the silver in the blue emulsion layer. In particular, the blue light 320b is reflected from the silver halide and measured by the sensor system 304b to produce a blue record. Many conventional films 106 include a yellow filter below the blue emulsion layer that blocks the blue light 320a from illuminating the other emulsion layers of the film 106. As a result, noise created by cross-talk between the blue emulsion layer and the red and green emulsion layers is substantially reduced.

In another embodiment of the reflective scanning station 300b used to scan the blue emulsion layer of the film 106, the light 320b produced by the lighting system 302b comprises non-blue light. It has been determined that visible light other than blue light interacts in substantially the same manner with the various emulsion layers. In this embodiment, infrared light also interacts in substantially the same manner as non-blue light, with the exception that infrared light will not fog the emulsion layers of the film 106. In this embodiment, the non-blue light 320b interacts with the silver image in the blue emulsion layer of the film 106, but is transparent to the yellow dye within the blue emulsion layer of the film 106. This embodiment is prone to higher noise levels created by cross-talk between the blue and green emulsion layers of the film 106.

In yet another embodiment of the reflective scanning station 300b, the light 320b produced by the lighting system 302b comprises visible and infrared light. In this embodiment, blue light interacts with the yellow dye image and the silver image in the blue emulsion layer, green light interacts with magenta dye image and the silver in each of the emulsion layers, red light interacts with the cyan dye image and the silver in each of the emulsion layers, and the infrared light interacts with the silver in each emulsion layer of the film 106. In this embodiment, the sensor system 304b generally comprises a filtered detector 310b (not expressly shown) that measures the red, green, blue, and infrared light 320b from the film 106 to produce red, green, blue, and infrared records as sensor data 116b.

Although the scanning station 300b is illustrated with the lighting system 302b and the sensor system 304b located on front side of the film 106, the lighting system 302b and the sensor system 304b may also be located on the back side of the film 106. In this embodiment, the light 320b produced by the lighting system 302b may comprise red light. The red light largely interacts with the cyan dye image and silver in the red emulsion layer of the film 106 to produce a red record of the sensor data 116b.

FIG. 3D is a schematic diagram illustrating a scanning station 300c having a transmission-reflection architecture. The transmission-reflection architecture is the preferred embodiment of the scanning system 124. In this embodiment, the scanning station 300c comprises a first lighting system 302c, a second lighting system 302d, and a sensor system 304c. In the preferred embodiment, the lighting system 302c operates to illuminate the front side of the film 106 with light 320c, the second lighting system 302d operates to illuminate the backside of the film 106 with light 320d, and the sensor system 304c operates to measure the light 320c reflected from the film 106 and the light 320d transmitted through the film 106. Based on the measurements of the light 320b, 320d, the sensor system 304c produces sensor data 116c that is communicated to the data processing system 102. Lighting system 302c and 302d are similar to lighting system 302, and sensor system 304c is similar to the sensor system 304. Although scanning station 300c is illustrated with lighting systems 302c, 302d, a single light source may be used to produce light that is directed through a system of mirrors, shutters, filters, and the like, to illuminate the film 106 with the front side of the film 106 with light 320c and illuminate the back side of the film 106 with light 320d. The light 320c, 320d may comprise any color or color combinations, including infrared light.

This embodiment of the scanning station 300c utilizes many of the positive characteristics of the transmission architecture scanning station 300a and the reflection architecture scanning station 300b. For example, the blue emulsion layer is viewed better by light 320c reflected from the film 106 than by light 320d transmitted through the film 106; the green emulsion layer is viewed better by light 320d transmitted through the film 106 than by light 320c reflected from the film 106; and the red emulsion layer is adequately viewed by light 320d transmitted through the film 106. In addition, the cost of the scanning station 300c is minimized through the use of a single sensor system 304c.

In the preferred embodiment of the scanning station 300c, the light 320c comprises blue light, and light 320d comprises red, green, and infrared light. The blue light 320c interacts with the yellow dye image and silver in the blue emulsion layer of the film 106. The sensor system 304c measures the light 320c from the film 106 and produces a blue-silver record. The red and green light 320d interacts with the cyan and magenta dye images, respectively, as well as the silver in the film 106. The infrared light 320d interacts with the silver, but does not interact with the dye clouds within the film 106. As discussed previously, the silver contained within the film 106 may comprise silver grains, silver halide, or both. The red, green, and infrared light 320d transmitted through the film 106 is measured by the sensor system 304c, which produces a red-silver, green-silver, and silver record. The blue-silver, red-silver, green-silver, and silver records form the sensor data 116c that is communicated to the data processing system 102. The data processing system 102 utilizes the silver record to facilitate removal of the silver component from the red, green, and blue records.

In another embodiment, the light 320c comprises blue light and infrared light, and light 320d comprises red, green, and infrared light. As discussed previously, the blue light 320c mainly interacts with the yellow dye image and silver within the blue emulsion layer of the film 106. The infrared light 320c interacts with mainly the silver in the blue emulsion layer of the film 106. The sensor system 304c measures the blue and infrared light 320c from the film 106 and produces a blue-silver record and a front side silver record, respectively. The red, green, and infrared light 320d interact with the film 106 and are measured by the sensor system 304c to produce red-silver, green-silver and transmitted-silver records as discussed above. The blue-silver, red-silver, green-silver, and both silver records form the sensor data 116c that is communicated to the data processing system 102. In this embodiment, the data processing system 102 utilizes the front side silver record of the blue emulsion layer to facilitate removal of the silver component from the blue-silver record, and the transmission-silver record is utilized to facilitate removal of the silver component from the red and green records.

Although the scanning station 300c is described in terms of specific colors and color combinations of light 320c and light 320d, the light 320c and light 320d may comprise other suitable colors and color combinations of light without departing from the scope of the invention. For example, light 320c may comprise non-blue light, infrared light, broadband white light, or any other suitable light. Likewise, light 320d may include blue light, broadband white light, or another other suitable light. Scanning station 300c may also comprise other suitable embodiments without departing from the scope of the invention. For example, although the scanning station 300c is illustrated with two lighting systems 302 and a single sensor system 304, the scanning station 300c could be configured with a single lighting system 302 and two sensor systems 304, wherein one sensor system measures light 320 reflected from the film 106 and the second sensory system 304 measures light 320 transmitted through the film 106. In addition, as discussed above, the scanning station 300 may comprise a single lighting system that illuminates the film 106 with light 320c and light 320d.

FIG. 3E is a schematic diagram illustrating a scanning station 300d having a reflection-transmission-reflection architecture. In this embodiment, the scanning station 300d comprises a first lighting system 302e, a second lighting system 302f, a first sensor system 304e, and a second sensor system 304f. In the embodiment illustrated, the lighting system 302e operates to illuminate the front side of the film 106 with light 320e, and the second lighting system 302f operates to illuminate the back side of the film 106 with light 320f. The first sensor system 304e operates to measure the light 320e reflected from the film 106 and the light 320f transmitted through the film 106, and the second sensor system 304f operates to measure the light 320f reflected from the film 106 and the light 320e transmitted through the film 106. Based on the measurements of the light 320e and 320f, the sensor systems 304e, 304f produce sensor data 116ef that is communicated to the data processing system 102. Lighting systems 302e, 302f are similar to lighting systems 302, and sensor systems 304e, 304f are similar to the sensor system 304. Although scanning station 300d is illustrated with lighting systems 302e, 302f, and sensor systems 304e, 304f, a single lighting system and/or sensory system, respectively, may be used to produce light that is directed through a system of mirrors, shutters, filters, and the like, to illuminate the film 106 with the frontside of the film 106 with light 320e and illuminate the backside of the film 106 with light 320f.

This embodiment of the scanning station 300d expands upon the positive characteristics of the transmission-reflection architecture of scanning station 300c. For example, as discussed in reference to FIG. 3D, the blue emulsion layer is viewed better by light 320e reflected from the film 106 and the green emulsion layer is viewed better by light 320e or 320f transmitted through the film 106. Second sensor system 304f allows viewing of the red emulsion layer by light 320f reflected from the film 106, which generally produces better results than viewing the red emulsion layer by light 320e or light 320f transmitted through the film 106.

In one embodiment of the scanning station 300d, the light 320e and 320f comprises light within the infrared portion of the electromagnetic spectrum. In this embodiment, the sensor system 304e measures light 320e reflected from the front emulsion layer and light 320f transmitted through the film 106. The sensor system 304f measures light 320f reflected from the back emulsion layer and light 320e transmitted through the film 106. In general, the front measurement corresponds to the blue signal, the back measurement corresponds to the red signal, and the through measurement minus the front and back measurement corresponds to the green signal. In this embodiment, cross-talk exists between the emulsion layers, as the emulsion layers are not spectrally unique using infrared light.

In the preferred embodiment of the scanning station 300d, the sensor systems 304e, 304f include a trilinear array of filtered detectors, and the light 320e and the light 320f comprises broadband white light and infrared light. The trilinear array operates to simultaneously measure the individual red, green, and blue components of the broadband white light 320e, 320f. The infrared light is measured separately and can be measured through each filtered detector 310 of the sensor systems 304e, 304f. The broadband white light 320e, 320f interacts with the silver and magenta, cyan, and yellow color dyes in the film 106, respectively, and the infrared light 320e, 320f interacts with the silver within the film 106. The reflected white light 320e measured by the first sensor system 304e includes information corresponding to the yellow dye image and the silver in the blue emulsion layer of the film 106. In particular, the blue component of the broadband white light 320e measured by the blue detector of the sensor system 304e corresponds to the yellow dye image, and the non-blue components of the broadband white light 320e measured by the red and green detectors corresponds to the red and green dye images and all the silver within the emulsion layers of the film 106. Similarly, the red component of the broadband white light 320f measured by the red detector of the sensor system 304f corresponds largely to the cyan dye image, and the non-red components of the broadband white light 320e measured by the blue and green detectors corresponds to the yellow and magenta dye images and all the silver within the emulsion layers of the film 106. The white light 320e, 320f transmitted through the film 106 interacts with each color dye image and silver within the film 106, and the red, green, and blue light components are measured by the red, green, and blue detectors of the sensor systems 304e, 304f to produce individual red, green and blue light records that include the silver record. The infrared light 320e reflected from the film 106 and measured by the sensor system 304e corresponds largely to the silver in the blue emulsion layer of the film 106, and the infrared light 320f reflected from the film 106 and measured by the sensor system 304f largely corresponds to the silver in the red emulsion layer of the film 106. The infrared light 320e, 320f transmitted through the film 106 measured by the sensor systems 304e, 304f corresponds to the silver in the red, green, and blue emulsion layers of the film 106. The individual measurements of the sensor systems 304e, 304f are communicated to the data processing system 102 as sensor data 116ef. The data processing system 102 processes the sensor data 116ef and constructs the digital image 108 using the various sensor system measurements. For example, the blue signal value for each pixel can be calculated using the blue detector data from the reflected light 320e and the blue detector data from the transmitted light 320f, as modified by non-blue detector data from the reflected light 320e, and the non-blue detector data from the transmitted light 320e or 320f. The red and green signal values for each pixel can be similarly calculated using the various measurements.

In another embodiment of the scanning station 300d, the sensor systems 304e, 304f include a trilinear array of filtered detectors, and the light 320e and the light 320f comprises broadband white light. This embodiment of the scanning station 300d operates in a similar manner as discussed above, with the exception that infrared light is not measured or used to calculate the digital image 108.

Although the scanning station 300d is described in terms of a specific colors and color combinations of light 320e and light 320f, the light 320e and light 320f may comprise other suitable colors and color combinations of light without departing from the scope of the invention. Likewise, the scanning station 300d may comprise other suitable devices and systems without departing from the scope of the invention.

While the invention has been particularly shown and described in the foregoing detailed description, it will be understood by those skilled in the art that various other changes in form and detail may be made without departing from the spirit and scope of the invention.

What is claimed is:

1. A film processing solution cartridge comprising:
   a housing operable to be replaceably attached to a film processing system;
   a chamber disposed within the housing;
   a film processing solution disposed within the chamber;
   a flexible tube in communication with the film processing solution within the chamber, the flexible tube forming a portion of a peristaltic pump; and
   a bladder disposed within the chamber and containing the film processing solution.

2. The film processing solution cartridge according to claim 1,
   wherein the film processing solution cartridge can be refilled with film processing solution.

3. The film processing solution cartridge of claim 1, further comprising an applicator.

4. The film processing solution cartridge of claim 3, wherein the applicator comprises a slot coater device.

5. The film processing solution cartridge according to claim 3, wherein the applicator comprises a fluid jet applicator.

6. The film processing solution cartridge of claim 3, wherein the applicator is movably attached to the housing.

7. The film processing solution cartridge of claim 6, wherein the applicator is pivotally attached to the housing.

8. The film processing solution cartridge of claim 6, further comprising a docking station operable to receive the applicator.

9. The film processing solution cartridge of claim 1, further comprising a fluid indicator operable to facilitate in determining the quantity of processing solution contained within the chamber.

10. The film processing solution cartridge of claim 9, wherein the fluid indicator comprises an electronic device operable to track the quantity of dispensed processing solution.

11. The film processing solution cartridge of claim 10, wherein the electronic device comprises an EPROM.

12. The film processing solution cartridge of claim 9, wherein the fluid indicator comprises a site gage.

13. The film processing solution cartridge of claim 1, further comprising a fluid communication system operable to communicate the processing solution to an applicator.

14. The film processing solution cartridge of claim 13, wherein the fluid communication system includes a shuttle valve operable to open upon installation of the film processing solution cartridge into the film processing system.

15. The film processing solution cartridge of claim 13, wherein the fluid communication system includes a leak valve operable to prevent leakage of processing solution from the film procession solution cartridge.

16. The film processing solution cartridge of claim 1, wherein the housing is fabricated from plastic.

17. The film processing solution cartridge of claim 1, wherein the housing includes an locating feature operable to locate the film processing solution cartridge within the film processing system.

18. The film processing solution cartridge of claim 1, wherein the film processing solution comprises a developer solution.

19. The film processing solution cartridge of claim 1, wherein the film processing solution includes a bleaching agent.

20. A film processing solution cartridge comprising:
   a housing operable to be replaceably attached to a film processing system;
   a chamber disposed within the housing;
   a film processing solution disposed within the chamber;
   a flexible tube in communication with the film processing solution within the chamber, the flexible tube forming a portion of a peristaltic pump;
   an applicator movably attached to the housing; and
   a capping station operable to receive the applicator.

21. A film processing solution cartridge comprising:
   a housing operable to be replaceably attached to a film processing system;
   a chamber disposed within the housing;
   a film processing solution disposed within the chamber;
   a flexible tube in communication with the film processing solution within the chamber, the flexible tube forming a portion of a peristaltic pump;
   an applicator movably attached to the housing; and
   a cleaning station operable to clean the applicator.

22. An applicator station for a film processing system comprising:
a reservoir containing a sufficient quantity of a processing solution to coat the processing solution onto multiple rolls of film;
an applicator operable to coat the processing solution onto the film; and
a fluid delivery system operable to communicate the processing solution from the reservoir to the applicator;
wherein the reservoir can be refilled with processing solution and the fluid delivery system includes a piston operable to compress the reservoir.

23. The applicator station of claim 22, wherein the reservoir comprises a container operable to be replaceably coupled to the film processing system.

24. The applicator station for a film processing system according to claim 22,
wherein the reservoir comprises a collapsible container configured to collapse as the processing solution is dispensed therefrom.

25. The applicator station for a film processing system according to claim 22,
wherein the fluid delivery system comprises a peristaltic pumping system.

26. The applicator station of claim 22, wherein the applicator comprises a slot coat applicator.

27. The applicator station for a film processing system according to claim 22,
wherein the applicator comprises a fluid jet applicator.

28. The applicator station of claim 22, wherein the reservoir and applicator are integrated in a developer cartridge.

29. The applicator station of claim 28, wherein the applicator is movably coupled to the reservoir.

30. An applicator station for a film processing system comprising:
a reservoir containing a sufficient quantity of a processing solution to coat the processing solution onto multiple rolls of film;
an applicator operable to coat the processing solution onto the film;
a fluid delivery system operable to communicate the processing solution from the reservoir to the applicator, wherein the reservoir and applicator are integrated in a developer cartridge, and the applicator is movably coupled to the reservoir; and
a docking station operable to receive the applicator.

31. The applicator station of claim 28, wherein the developer cartridge includes a fluid communication system.

32. The applicator station of claim 31, wherein the fluid communication system is operable to be acted upon by a peristaltic pump.

33. The applicator station of claim 31, wherein the fluid communication system includes a shuttle valve operable to open upon installation of the developer cartridge into the film processing system.

34. The applicator station of claim 28, wherein the developer cartridge includes an locating feature operable to locate the developer cartridge within the film processing system.

* * * * *